United States Patent [19]
Poulton et al.

[11] Patent Number: 5,481,669
[45] Date of Patent: Jan. 2, 1996

[54] ARCHITECTURE AND APPARATUS FOR IMAGE GENERATION UTILIZING ENHANCED MEMORY DEVICES

[75] Inventors: John W. Poulton; Steven E. Molnar; John G. Eyles, all of Chapel Hill, N.C.

[73] Assignee: The University of North Carolina at Chapel Hill, Chapel Hill, N.C.

[21] Appl. No.: 383,969

[22] Filed: Feb. 6, 1995

Related U.S. Application Data

[63] Continuation of Ser. No. 975,821, Nov. 13, 1992, Pat. No. 5,388,206.

[51] Int. Cl.$^6$ .................................................. G06F 12/00
[52] U.S. Cl. ......................... 395/164; 395/163; 395/162
[58] Field of Search ............................... 395/162–164, 395/127, 425, 650, 118, 140, 141; 345/185, 189, 201

[56] References Cited

U.S. PATENT DOCUMENTS

| | | | |
|---|---|---|---|
| 4,590,465 | 5/1986 | Fuchs | 395/118 |
| 4,648,045 | 3/1987 | Demetrescu | 395/163 |
| 4,783,649 | 11/1988 | Fuchs et al. | 345/189 |
| 4,827,445 | 5/1989 | Fuchs | 345/189 |
| 5,388,206 | 2/1995 | Poulton et al. | 395/163 |

FOREIGN PATENT DOCUMENTS

WO92/09947  6/1992  WIPO ........................ G06F 2/14

OTHER PUBLICATIONS

Fussell et al., *A VLSI–Oriented Architecture for Real–Time Raster Display of Shaded Polygons (Preliminary Report)*; Graphics Interface '82, pp. 373–380, 1982.

Shaw et al., *A VLSI Architecture for Image Composition;* pp. 185–199, 1988.

Demetrescu, *High Speed Image Rasterization Using Scan Line Access Memories;* 1985 Chapel Hill Conference on VLSI, pp. 221–243, 1989.

Gharachorloo et al., *Subnanosecond Pixel Rendering with Million Transistor Chips;* Computer Graphics, vol. 22, No. 4, Aug. 1988.

Evans & Sutherland, Design Systems Divisions, *Technical Report.*

Molnar et al., *Pixel Flow: High–Speed Rendering Using Image Composition;* Computer Graphics, vol. 26, No. 2, Jul. 1992.

Molnar, *Image–Composition Architectures for Real–Time Image Generation;* Dissertation submitted to Univ. of N.C.–Chapel Hill, 1991.

Molnar, *Supercomputing Power for Interactive Visualizaiton;* Report of Research Progress, Mar. 1991—Nov. 1991; Univ. of N.C.—Chapel Hill, 1991.

Poulton, *Breaking the Frame–Buffer Bottleneck with Logic–Enhanced Memories,* IEEE Computer Graphics and Applications, Nov. 1992, pp. 65–74.

*Primary Examiner*—Raymond J. Bayerl
*Assistant Examiner*—Kee M. Tung
*Attorney, Agent, or Firm*—Bell, Seltzer, Park & Gibson

[57] ABSTRACT

A system for image generation comprising a plurality of renderers, each having a geometry processor and a rasterizer, that operate in parallel to compute pixel values for a set of primitive objects that comprise the image to be rendered. The geometry processor transforms graphics primitive objects from their native object coordinates to screen coordinates. The rasterizer consists of an array of enhanced memory devices having a processor and memory for each pixel in a region of a screen. The processors and their associated memories operate in SIMD fashion on screen space primitive descriptions to compute and store pixel values for an entire such region. The enhanced memory devices further comprise compositors for combining their pixel values, for example, based on a visibility test, with those from a corresponding memory device of another rasterizer. The image generation system may further comprise shaders, which compute pixel colors based on pixel values computed in the plurality of renderers, and video frame buffers, which store these pixel colors and refresh a raster display device. The shaders and frame buffers consist of a renderer with additional memory devices that store texture and image data. Also disclosed are enhanced memory devices and rasterizers for use in the present image generation system.

15 Claims, 17 Drawing Sheets

ARCHITECTURE AND APPARATUS FOR IMAGE GENERATION UTILIZING ENHANCED MEMORY DEVICES

This application is a continuation of issued prior application Ser. No. 07/975,821, filed Nov. 13, 1992, and will issue as U.S. Pat. No. 5,388,206 on Feb. 7, 1995, the disclosure of which is incorporated by reference herein in its entirety.

FIELD OF THE INVENTION

The present invention relates to image generation systems in general and in particular to image generation systems using image composition techniques. The present invention further relates to memory structures and hardware designs for implementing image generation systems using image composition techniques.

BACKGROUND OF THE INVENTION

Graphics applications such as flight and vehicle simulation, computer-aided design, scientific visualization, and virtual reality demand high-quality rendering, high polygon rates, and high frame rates. Existing commercial systems render at peak rates up to 2 million polygons per second (e.g., Silicon Graphics' SkyWriter and Hewlett-Packard's VRX). If antialiasing or realistic shading or texturing is required, however, their performance falls by an order of magnitude.

To support demanding applications, future graphics systems must generate high-resolution images of datasets containing hundreds of thousands or millions of primitives, with realistic rendering techniques such as Phong shading, antialiasing, and texturing, at high frame rates ($\geq 30$ Hz) and with low latency.

Attempts to achieve high performance levels encounter two bottlenecks: inadequate floating-point performance for geometry processing and insufficient memory bandwidth to the frame buffer. For example, to render a scene with 100,000 polygons updated at 30 Hz, geometry processing requires approximately 350 million floating-point operations per second, and rasterization requires approximately 750 million integer operations and 450 million frame-buffer accesses. Parallel solutions are mandatory.

Some current systems use pixel-parallelism for rasterization; frame-buffer memory is divided into several interleaved partitions, each with its own rasterization processor. This multiplies the effective frame-buffer bandwidth by the number of partitions, but does not reduce the number of primitives each processor must handle, since most primitives contribute to most partitions. Because of this limitation, and the bandwidth limitations of commercial VRAMs, this approach does not scale much beyond today's rates of a few million polygons per second.

Accordingly, it is an objective of the present invention to provide a high performance image generation system.

It is a further objective of the image generation system according to the present invention to support a wide variety of rendering algorithms and primitive types, from Gouraud-shaded polygons, to Phong-shaded volume data, to directly rendered Constructive-Solid-Geometry objects.

It is a further objective of the present invention to provide an architecture which is suitable for a variety of image generation functions including rasterizing/rendering, shading, texturizing and image buffering.

It is yet another objective of the present invention to provide an image generation system which is scalable over a wide variety of performance levels and to arbitrarily high levels by combining an arbitrary number of renderers. It is also an objective of the present invention to provide for a simplified programming model without any need for primitive redistribution. An additional objective of the present invention is to provide a high bandwidth image composition network suitable for use with antialiasing algorithms.

SUMMARY OF THE INVENTION

A first aspect of the present invention comprises an image generation system, comprising a primitive processing means for generating primitive screen data and a plurality of rasterizers associated with the primitive processing means for computing pixel values from the primitive screen data. The rasterizer comprises an enhanced memory device corresponding to a selected set of screen coordinates. The enhanced memory device has for each of the selected screen coordinates processing means for computing pixel values to provide a computed pixel value, storage means associated with each of the processing means for storing data, and a compositor buffer associated with each of the processing means for storing the computed pixel value. The enhanced memory device also has input means for receiving computed pixel values from a corresponding enhanced memory device associated with a different one of the plurality of geometry processors, compositor means for compositing the stored computed pixel value and the pixel value received by the input means to determine a composited pixel value, and output means operably associated with the compositor means for outputting the composited pixel value.

DETAILED DESCRIPTION OF THE PREFERRED EMBODIMENTS

The image generation system of the present invention exploits the advantages of image-composition to provide for real-time 3D graphics algorithms and applications. The image generation system of the present invention may be described with reference to FIGS. 1 through 16 but is not limited to the embodiments shown in those figures. The present invention will first be described generally and then a particular embodiment will be described for illustrative purposes.

Figure 1:
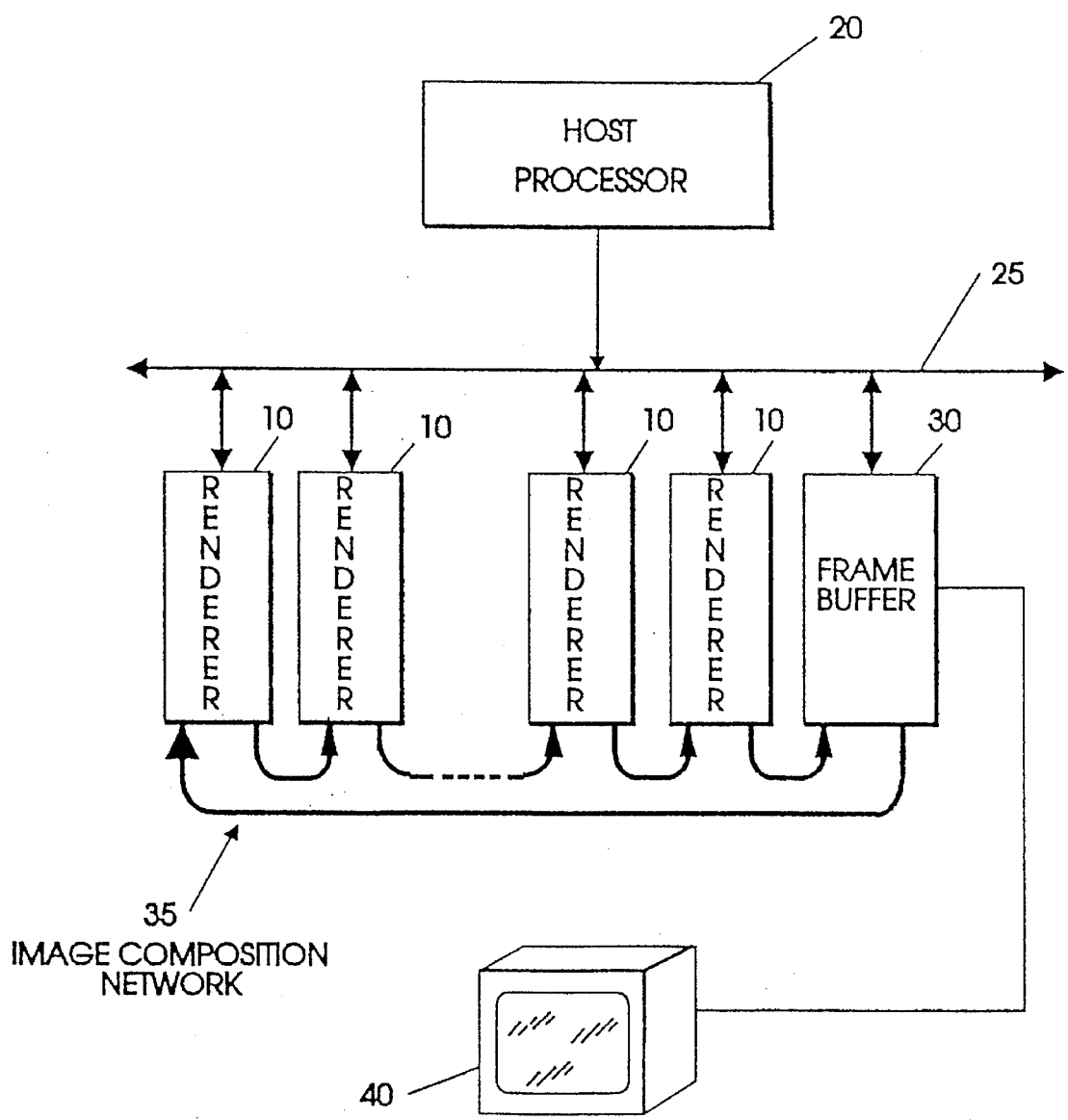
FIG. 1 is a block diagram illustrating one embodiment of the image generation system of the present invention.

As seen in FIG. 1, at its highest level the image generation system of the present invention is comprised of a plurality of renderers 10 acting in parallel to produce a final image. The renderers 10 receive primitives of a screen image from a host processor 20 over a host interface 25. Pixel values are then determined by the renderers 10 and the visibility of a particular pixel calculated by a given renderer determined through a compositing process and stored in the frame buffer 30 for display on the video display 40. The linear array of renderers results in the final image being produced at the output of the last renderer.

The primitives received by the renderers are geometric shapes which may be combined to create an image. Primitives may contain shape, depth, color, shading and other information about the image known to those of skill in this art. The primitives may be distributed throughout the plurality of renderers 10 in any of a number of schemes known to those of skill in this art. The final image is then created by putting together the pixel values calculated by the plurality of renderers. Image composition techniques are especially suited for use with the present image generation system as a means for recombining the pixel values from the plurality of renderers.

When image composition is used, primitives for the entire screen or a segment of the screen are distributed over the plurality of processors. Rather than having a single renderer calculate pixel values for all primitives for a portion of the screen, each of the renderers only calculates pixel values for a portion of the primitives for a region of the screen. A region of the screen may encompass the entire screen or a portion thereof. Therefore, all of the renderers calculate pixel values for the same portion of the screen and then these pixel values from each of the renderers are combined to produce a final image for that portion of the screen. The regions of the screen are processed sequentially until the final image is produced. This combination of pixel values for a region of the screen from the plurality of renderers is referred to as compositing.

Figure 2:
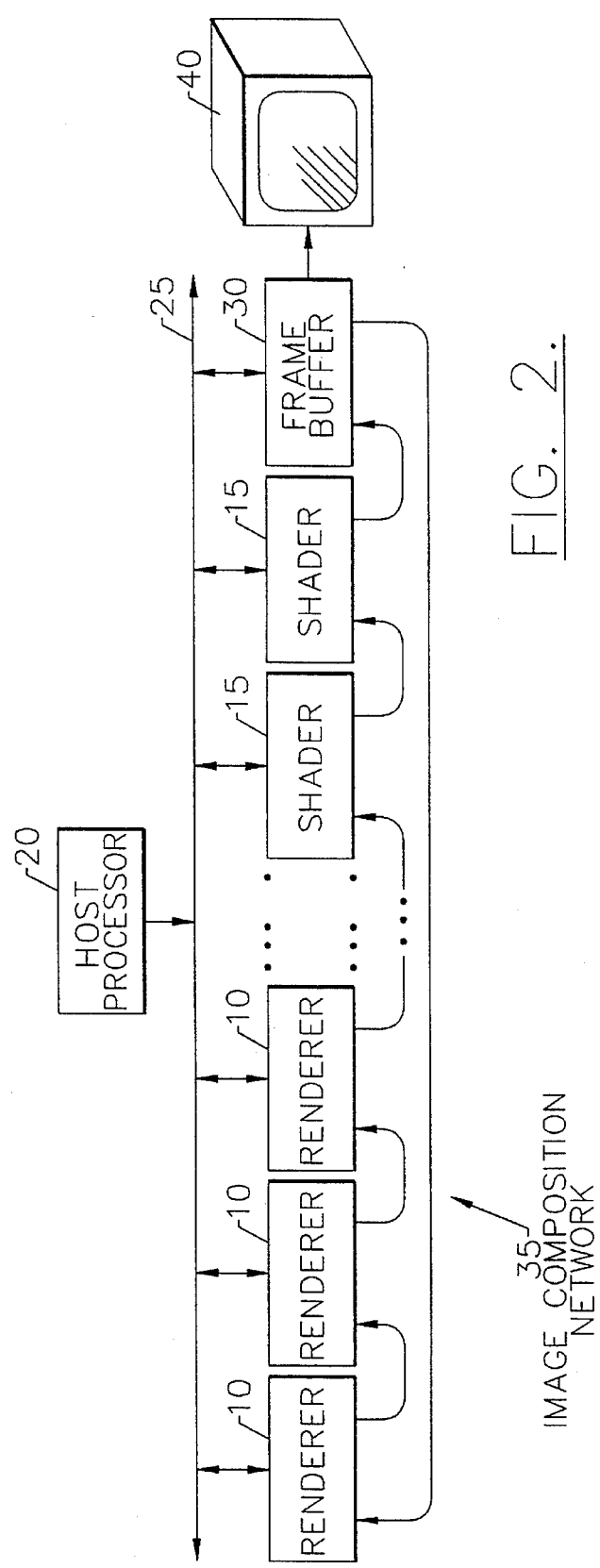
FIG. 2 is a block diagram illustrating a second embodiment of the image generation system of the present invention including shader boards.

As shown in FIG. 2, the image generation system may further include shaders 15 which provide for texturing and shading of the image after composition by the renderers 10 and before storage in the frame buffer 30. The shaders may also be used to perform antialiasing operations. The shaders receive shading instructions from the host processor 20 and the composited pixel values from the last renderer in the linear array of renderers 10. Deferred shading algorithms, such as Phong shading and procedural and image-based textures, are implemented on separate hardware shaders 15 that reside just ahead of the frame buffer 30. Regions of pixels, containing attributes such as intrinsic color, surface normals, and texture coordinates are rasterized and composited along the image composition network 35 of the renderers 10 and loaded into the shaders 15 from the image composition network 35. The image composition network 35 may optionally be structured as a ring network to allow any board to communicate with any other board. It will be apparent to one of skill in the art that other means for structuring the image composition network would also provide this capability. Shaders 15 operate on entire regions in parallel, to convert raw pixel attributes into final RGB values, blend multiple samples together for antialiasing, and forward final color values to the frame buffer 30 over the image composition network 35.

Figure 3:
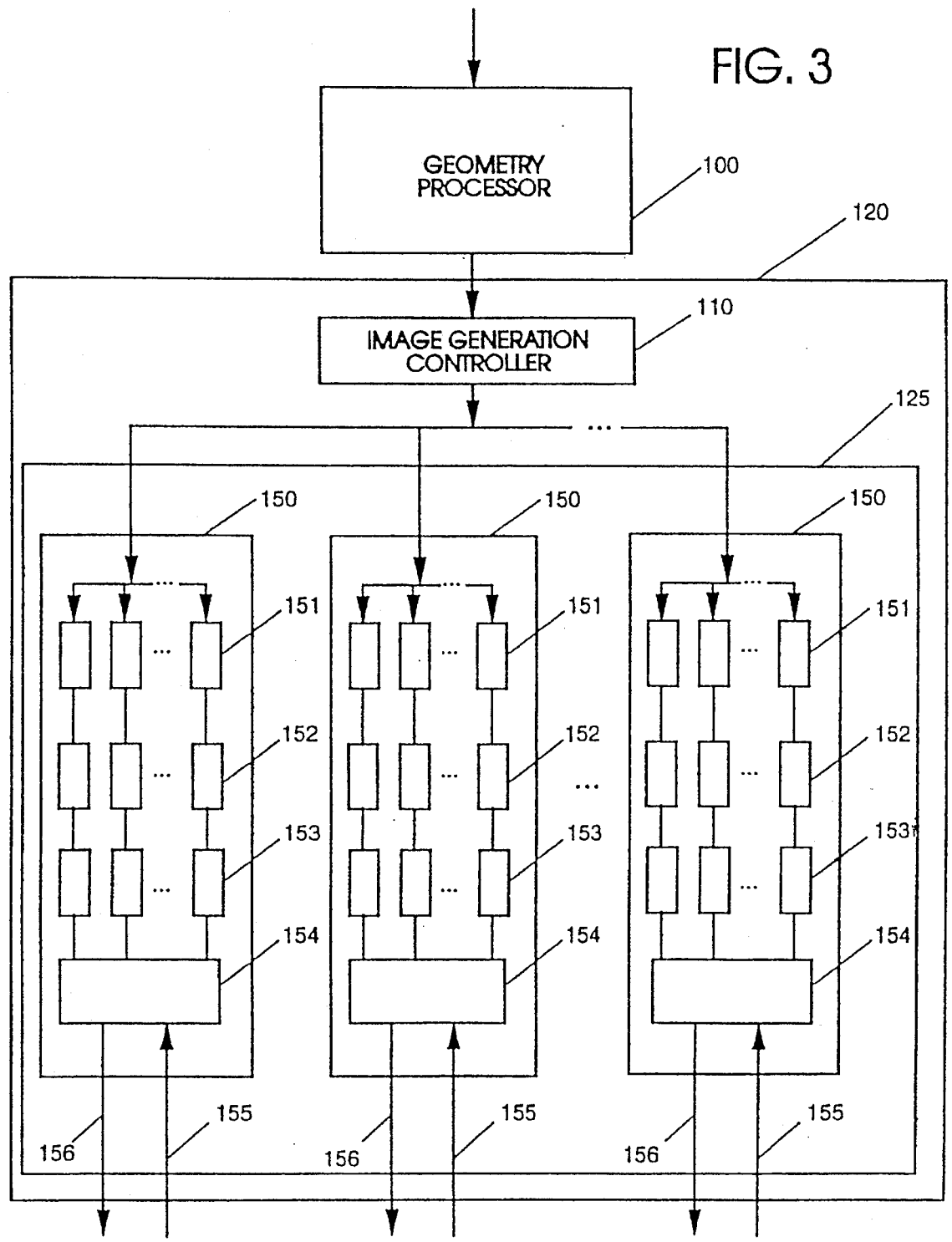
FIG. 3 is a block diagram illustrating an embodiment of a renderer according to the present invention.

FIG. 3 is a block diagram of a renderer 10 according to the present invention. Each of the plurality of renderers may be identical. The renderers 10 are comprised of a geometry processor 100 for receiving primitives and translating the primitives to screen coordinates to provide primitive screen data. This primitive screen data is then transferred to a rasterizer 120 associated with the geometry processor for computing pixel values from the primitive screen data. Alternatively, this primitive screen data could be provided by the host processor 20 or by other primitive processing means to the renderer 10. The renderer would then not include a geometry processor 100.

The rasterizer 120 is made up of an image generation controller 110 and at least one enhanced memory device 150, but preferably a plurality of enhanced memory devices forming an enhanced memory device array 125. The image generation controller 110 receives the primitive screen data and provides it to the enhanced memory devices 150. The image generation controller 110 may also adjust the values received from the geometry processor 100 before passing the values on to the enhanced memory devices 150 for use in antialiasing. Each of these enhanced memory devices 150 corresponds to a selected set of screen coordinates such that any pixel coordinate in the region of the screen being generated has a corresponding enhanced memory device. Each of the enhanced memory devices 150 has a pixel processor 151 or other processing means, for each of the set of coordinates associated with that particular enhanced memory device for computing pixel values. The enhanced memory devices have storage means 152 associated with each of the pixel processors 151 for storing data for use by these pixel processors. Each of the enhanced memory devices 150 further has a compositor buffer 153 or other storage means associated with each of said pixel processors for storing the computed pixel values for each screen coordinate. The enhanced memory devices also have a compositor input 155 or other input means, for receiving computed pixel values from the corresponding enhanced memory devices associated with the other renderers and a compositor output 156 or other output means, for outputting the computed pixel values. The enhanced memory devices also have compositor circuitry 154 or other compositing means for compositing the computed pixel value stored in the compositor buffer 153 and the pixel value received at the compositor input 155, and providing the composited pixel values to the compositor output 156.

By adding the capability to load the values received at the compositor input 155 into the enhanced memory device 150, the renderer 10 may be utilized for shading functions. In this case, the shader 15 would receive shading information from the host processor for use by the geometry processor 100 and rasterizer 120. As described below, further modifications to the basic renderer design may be made to allow for texturing.

Of particular advantage to the image generation system of the present invention is the modularity of the structure of the renderers, shaders and frame buffer. The single instruction multiple data (SIMD) rasterizer 120 used in the renderer 10 is an ideal processor for deferred shading, because shading calculations can be performed for all pixels simultaneously. Therefore, the shaders 15 can simply be designated renderers, with a slight enhancement of the compositor circuitry 154 on the enhanced memory devices to allow bidirectional data transfers between the image composition network 35 and the enhanced memory devices 150. Shaders can be augmented with additional hardware to allow them to compute image-based textures in addition to procedural textures.

Figure 4A:
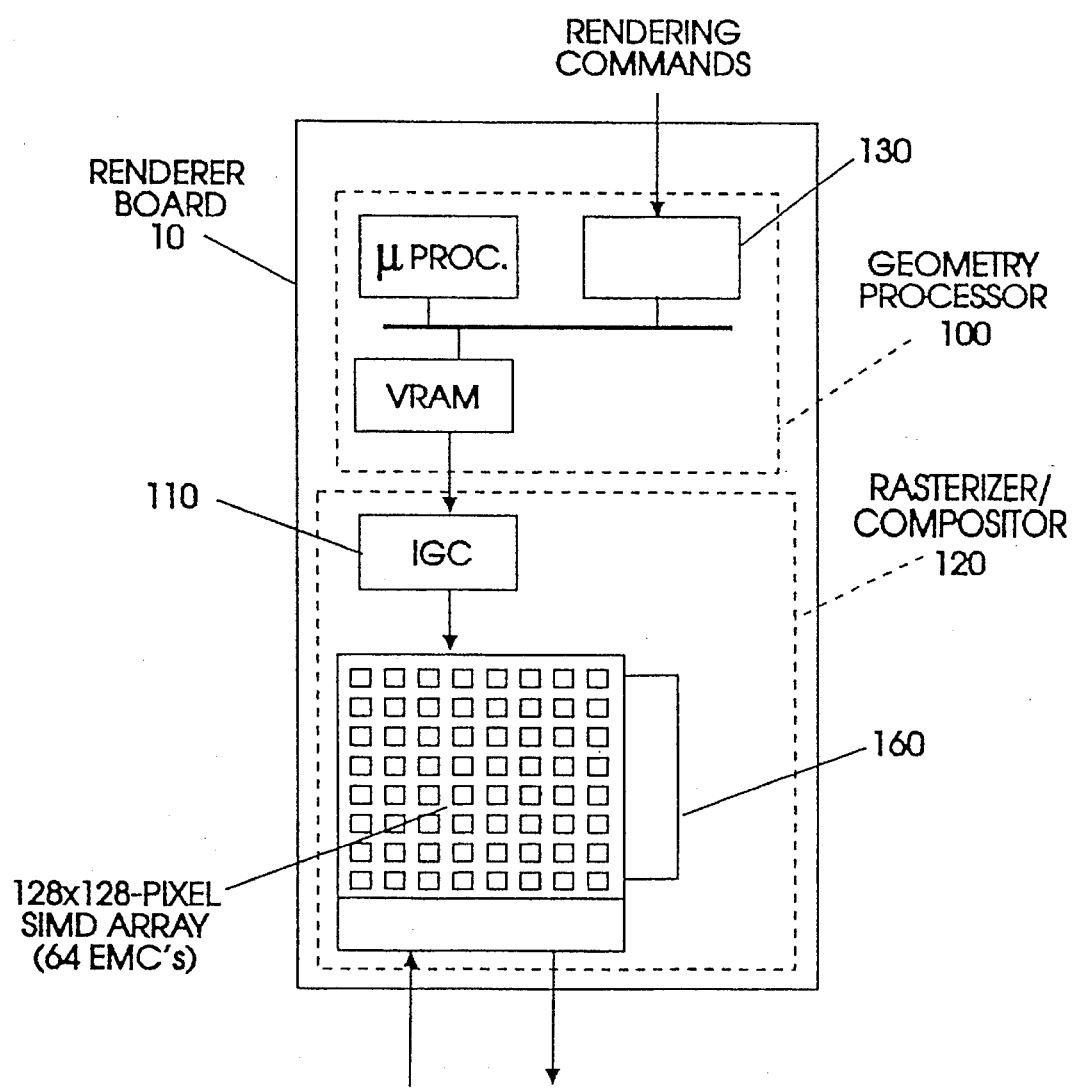
FIG. 4a is a block diagram illustrating an embodiment of a renderer according to the present invention.
Figure 4B:
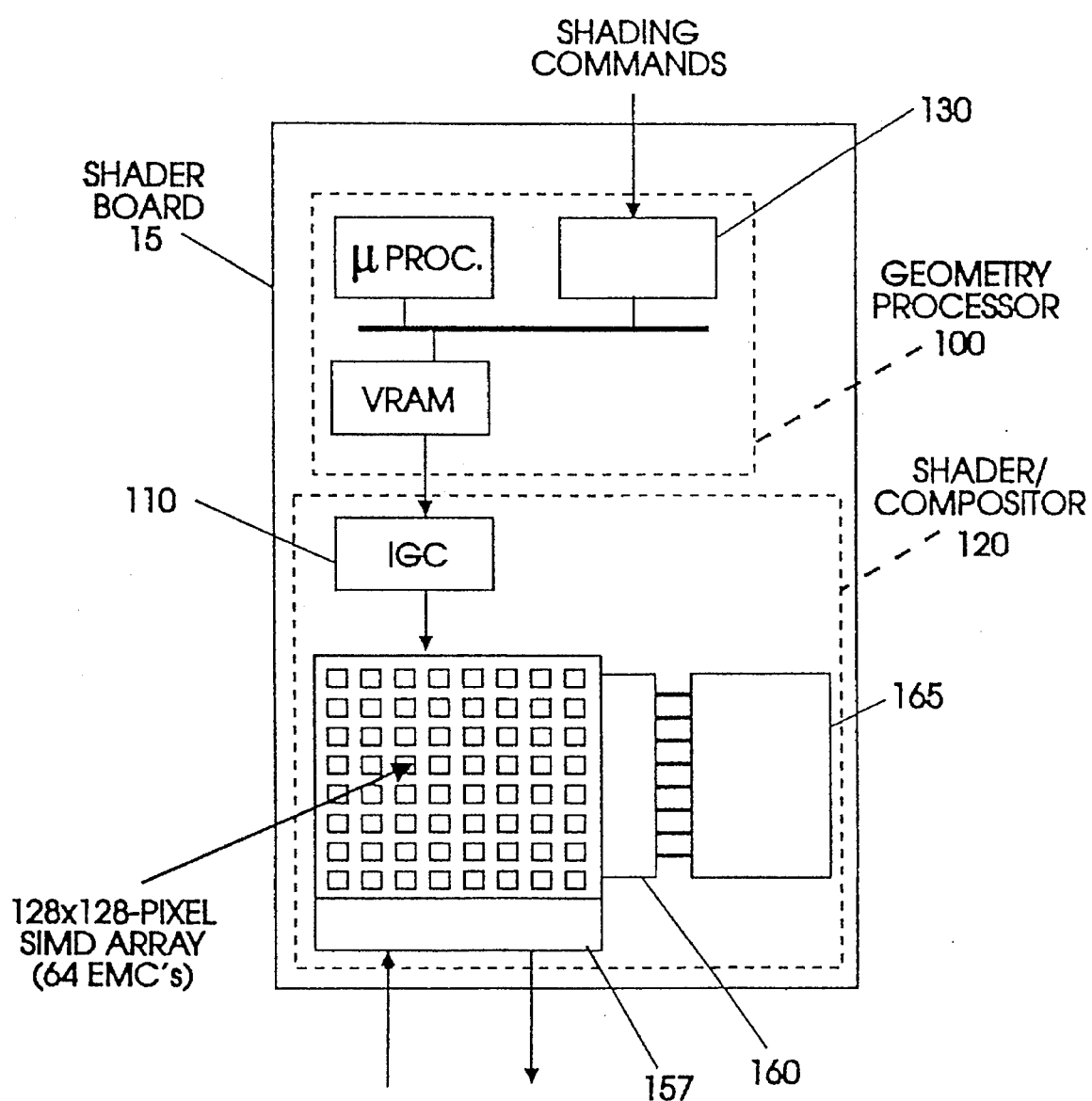
FIG. 4b is a block diagram illustrating an embodiment of a shader according to the present invention.
Figure 4C:
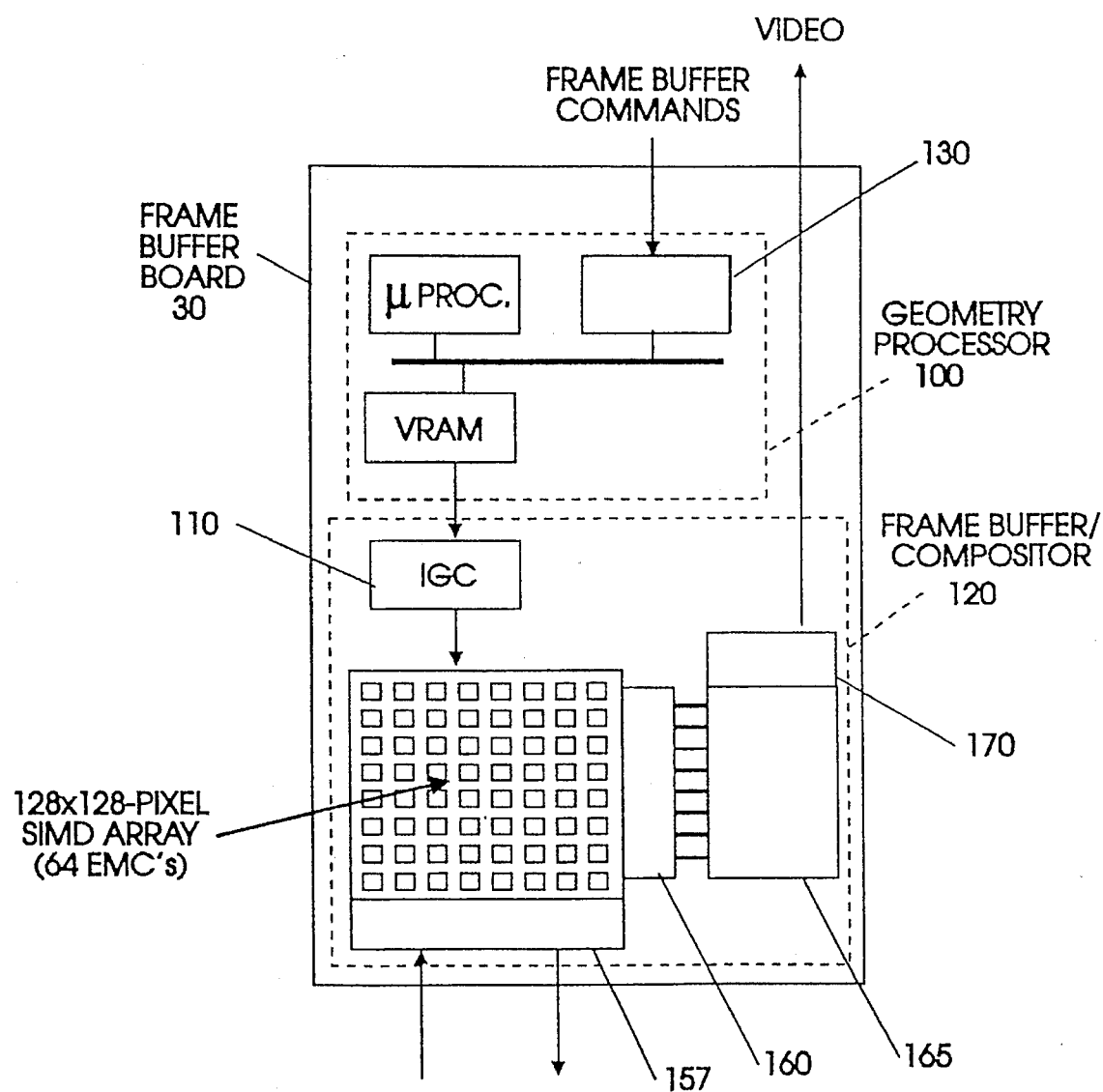
FIG. 4c is a block diagram illustrating an embodiment of a frame buffer according to the present invention.

As seen in FIG. 4, the shader 15, shown in FIG. 4b, and frame buffer 30, shown in FIG. 4c, are substantially the same as the renderer 10, shown in FIG. 4a. As seen in FIG. 4b, the addition of a local port 160 to the enhanced memory devices 150 allows for texturing as described above. A local buffer 161 stores data for access by the pixel processors 151 and the local port 160. The local port 160 provides access to local external memory 165 or other external memory means which may be used for storing texturing information. Thus, by the addition of the local port 160, the local buffer 161 and the local external memory 165, the renderer 10 may be utilized as a shader 15 and perform texturing algorithms.

Similarly, through the addition of the local buffer 161, the local port 160 and the local external memory 165, all that need be added to the shader 15 to operate as a frame buffer 30 is the inclusion of video circuitry 170. As shown in FIG. 4c, as a frame buffer 30, the local external memory 165 acts as the frame buffer memory and the video circuitry 170 reads the pixel image data from the memory. In the frame buffer 30, the local memory 165 is, in one embodiment, a separate double-buffered VRAM frame buffer.

In one embodiment of the present invention, the primitives received from the host processor 20 are transformed by the geometry processor into primitive screen data represented as coefficients of mathematical expressions $f(x,y)$ representing the primitive. In particular, the primitives may be linearized into a series of equations of the form $f(x,y) = Ax+By+C$, where x and y are screen pixel coordinates and A, B and C are coefficients which define a plane contained in a particular primitive. The use of linear expressions of the above form to render primitives is described in U.S. Pat. No. 4,590,465 at column 4, line 47 through column 6, line 8, the disclosure of which is incorporated herein by reference as if set forth fully. While linearization has been described, other mathematical expressions such as quadratic, or other polynomial representations in screen coordinates may be utilized.

In one embodiment of the present invention, the geometry processor 100 provides the A, B and C coefficients to the enhanced memory devices 150 through the image generation controller 110. The image generation controller 110 controls the enhanced memory device array 125. It converts floating-point A, B, and C coefficients into byte-serial, fixed-point form; it sequences enhanced memory device operations by broadcasting command information such as primitive data, control, and address information to the enhanced memory device array 125; and it controls the compositor ports 157 on the enhanced memory devices 150.

The image generation controller 110 may also be used for anti-aliasing through the use of super-sampling. Super-sampling involves calculating the pixel values at sub-pixel locations surrounding a pixel and then calculating the actual pixel value for a given screen coordinate by combination of these sub-pixel values. The image generation controller 110 can modify the coefficients to reflect the sub-pixel coordinates and then retransmit these coefficients to the enhanced memory devices 150 without obtaining additional coefficients from the geometry processor 100. The image generation controller 110 contains a subpixel offset register that allows for the multiple samples of the supersampling filter kernel to be computed from the same set of rasterization commands. This allows for increased system performance when supersampling, because additional samples are rasterized without increasing the load on the geometry processor.

Figure 5:
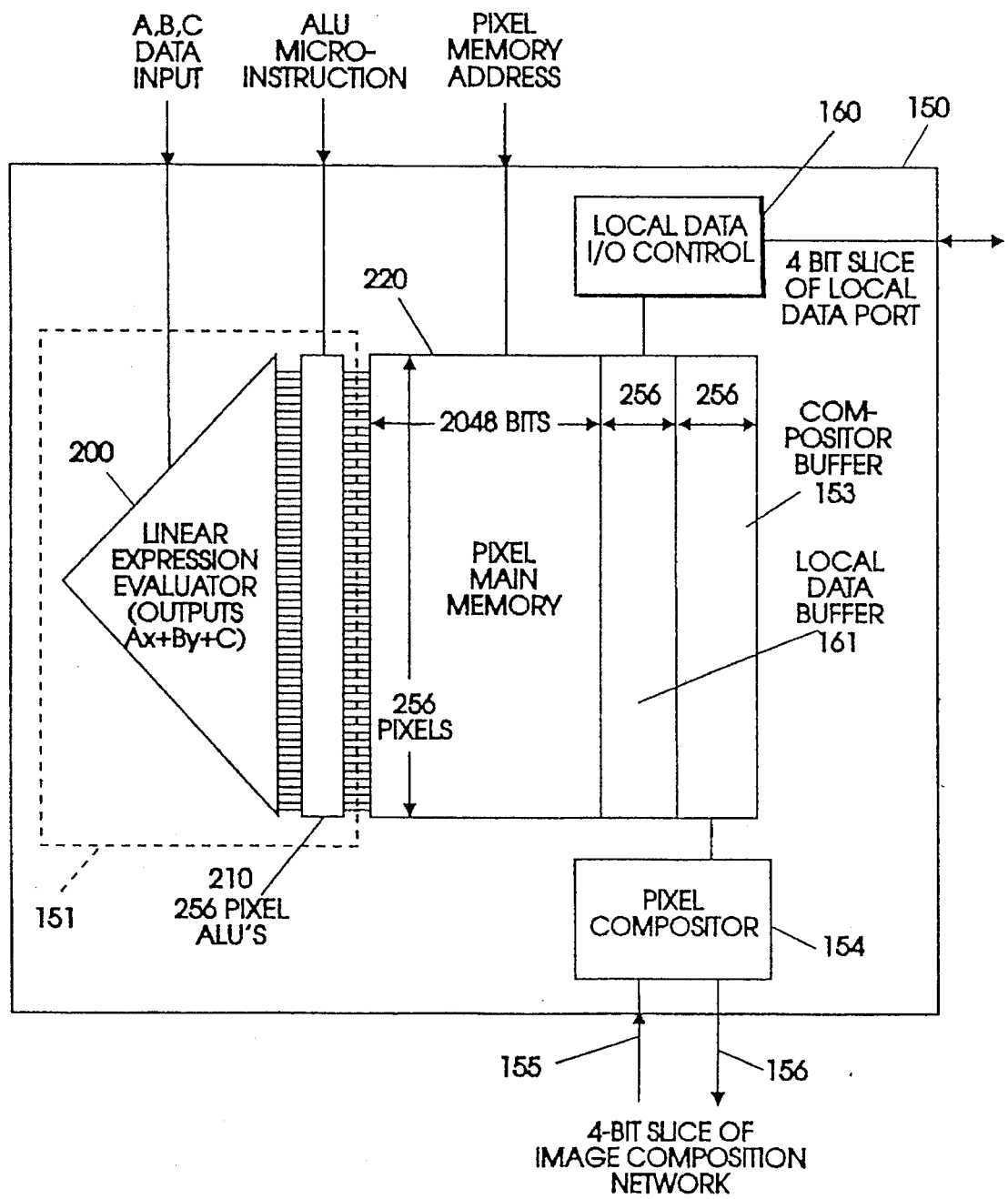
FIG. 5 is a block diagram illustrating an embodiment of an enhanced memory device according to the present invention.

FIG. 5 is a block diagram of a particular embodiment of the enhanced memory device 150 which is utilized in the image generation system of the present invention. It will be appreciated by those of skill in the art that the enhanced memory device of the present invention may be fabricated on a single integrated circuit or chip using fabrication techniques known to one of skill in the art.

As seen in FIG. 5, in this embodiment the pixel processors 151 each share a linear expression evaluator 200 which computes values of the primitive screen data as the bilinear expression $Ax+By+C$ defining a plane that represents a portion of a particular primitive at every pixel processor 151 in parallel. Each pixel processor 151 also has a small local ALU 210 that performs arithmetic and logical operations on the segment of local memory 220 which acts as the storage means 152 associated with that pixel processor and on the local value of the bilinear expression. Operation of the pixel processors 151 is SIMD (single-instruction-multiple-data), and all processors operate on data items at the same address. Each pixel processor 151 includes an enable register which qualifies writes to memory, so that a subset of the processors can be disabled for certain operations (e.g. painting a scan-converted polygon). Also included are the local buffer 161 for providing information for use by pixel processors 151 and receiving information from and outputting information to the local port 160. The compositor buffer 153 stores pixel values to be composited. The compositor buffer 153 provides its data to the compositor circuitry 154 for compositing and output. The compositor circuitry 154 receives data from the compositor input 155 and outputs data on the compositor output 156.

Figure 6:
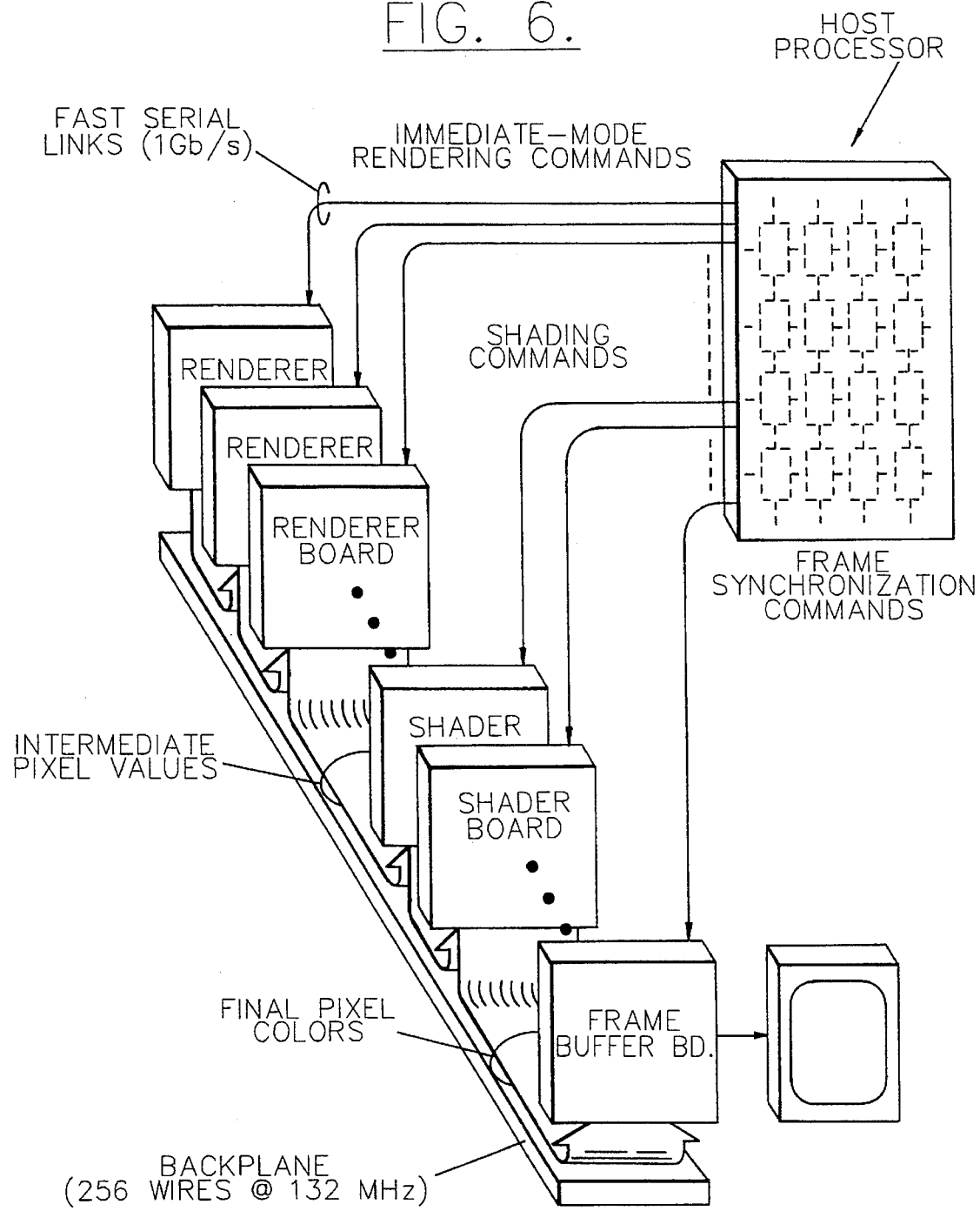
FIG. 6 is a pictorial diagram illustrating an embodiment of the image generation system of the present invention including shader boards in which the host processor is connected to each renderer and shader over a separate fast serial link.

As seen in FIG. 6, one embodiment of the image generation system of the present invention may be composed of one or more card cages, each containing multiple circuit boards and connected to a host processor 20. The boards in each card cage are attached to a common backplane, which contains an image composition network 35 that extends to each system board. Each board has provisions for connecting to the host processor 20. The backplane further distributes power and clocks to the system boards. Multiple card cages can be connected by placing them side-by-side and connecting their backplanes together with special bridge boards (not shown) and connectors.

The image generation system of the present invention contains three main board types:

Renderers 10, which are one-board graphics computers capable of rendering well over one million z-buffered triangles per second Shaders 15, which are one-board graphics computers capable of computing shading models for pixels in parallel and texturing; and Frame buffer 30, which buffers and displays composited pixels.

In a typical application, the host processor 20 is the overall system master. It loads code and data onto the various system boards, and sends the display primitives to the renderers 10.

The system rasterizes one region of the screen at a time. This means that transformed primitives must be sorted into bins for each screen region before rasterization can take place. These bins are stored in VRAM memory 502 of the geometry processor.

After the primitives have been sorted, they are converted into image generation controller instructions, and rasterized one bin at a time. The image generation controller 110 and enhanced memory device array 125 rasterize the primitives for each region. If several samples are required for each pixel, for example with supersampling antialiasing, the scene is rasterized several times with slightly different sub-pixel offsets for each pass. When a region has been rasterized, it is copied into the enhanced memory devices' compositor buffer 153, and composited over the image-composition network 35.

Shaders 15, if they are used, intercept regions of composited pixel values, and compute a shading model on each pixel in the region. When antialiasing with several samples per pixel, successive regions sent to each shader contain successive samples. The samples are blended together using precomputed blending coefficients stored at each shader. When all of the samples have been blended, the antialiased, shaded region of pixels is transferred over the image-composition network 35 to the frame buffer 30.

The frame buffer 30 receives shaded, antialiased pixels and stores them in the appropriate portion of its local external memory 165. When all of the regions for a frame have been received, it switches buffers, and displays the new frame.

Figure 7:
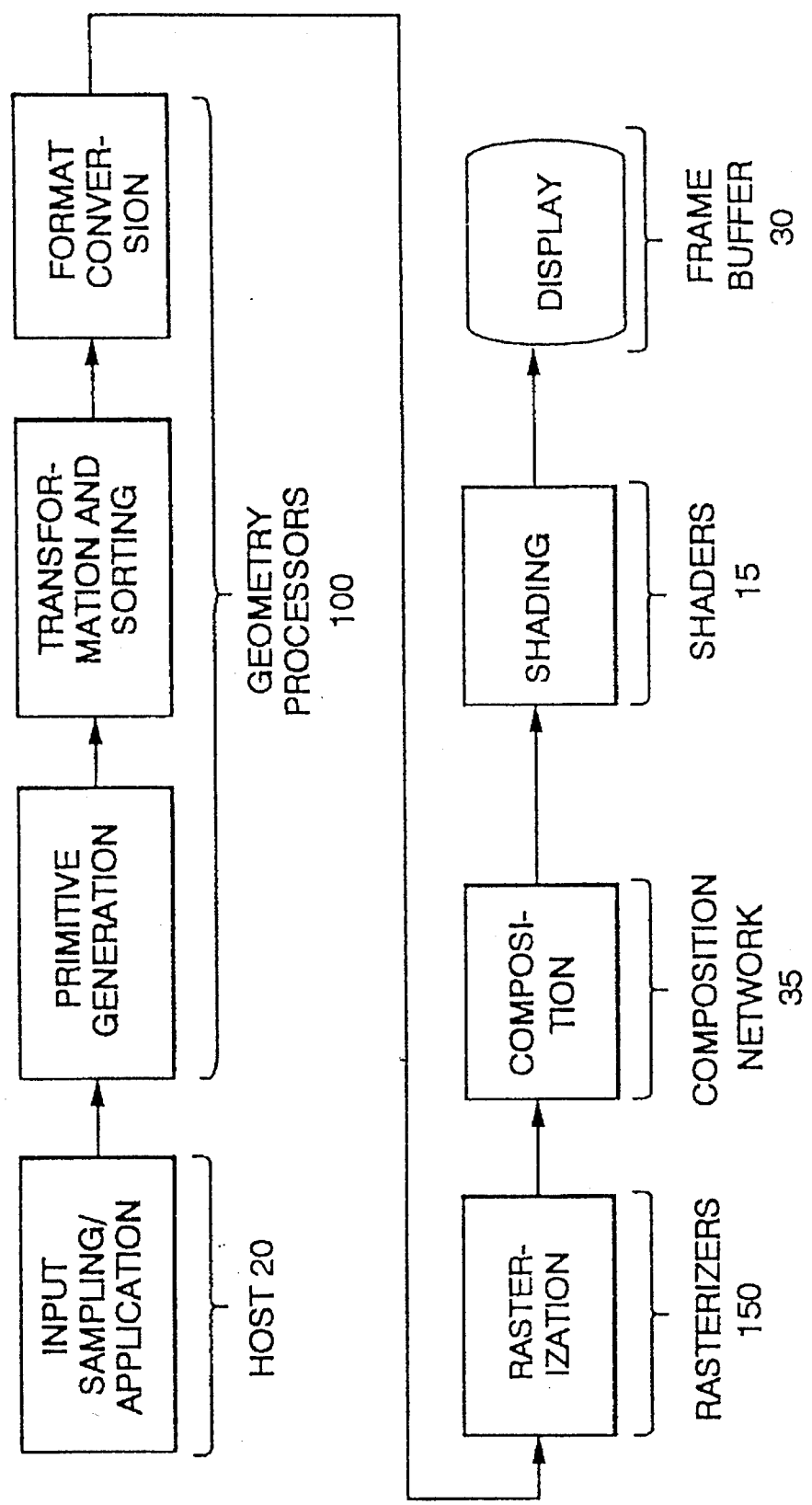
FIG. 7 is a block diagram illustrating the steps for rendering polygons and the system components on which they are executed for an embodiment of the image generation system of the present invention.

Note that rendering occurs in a discrete fashion: one 128×128 region is rasterized/shaded at a time. Each board in the system must know the type and location of each region to handle it in the appropriate way: whether to composite it, load it into a shader, unload it, forward it on without processing, and so forth. This is done by distributing a rendering recipe to each board before rendering begins. The rendering recipe is a list of the regions to be transferred over the image-composition network and the corresponding action to be taken for each region. For some boards, the rendering recipe is simple. For example, the frame buffer's rendering recipe simply states whether the region is to be stored and where, and at which point it should switch buffers. The rendering recipe for a shader is more complicated. It must load regions, blend other regions in, forward some regions on without processing, and unload other regions. FIG. 7 shows the steps for rendering polygons and the system components on which they are executed.

Host Processor. The host processor 20 may be a workstation, a multiprocessing system or some other general-purpose computer, that serves as the system master. It loads code and data onto the various system boards, samples user inputs, runs the application, and sends primitives to the renderers 10 and shading commands to the shaders 15.

Image-Composition Network. The image-composition network 35 may be a very wide (256-bit), high-speed special-purpose communication network for rapidly moving pixel data between adjacent boards. It performs two functions in different parts of the system: it transfers pixel data between compositors 154 in the renderers 10 and transfers rendered pixels from the shaders 15 to the frame buffer 30. The image-composition network 35 may be implemented as 256 wires that connect adjacent backplane slots. Compositors on each system board transmit data to compositors on an adjacent board.

The image-composition network 35 may be implemented as an extremely high bandwidth, ring-connected unidirectional datapath that extends across the entire system backplane (or backplanes-in a multiple-rack system). The backplane provides point-to-point wiring between boards, but the active circuitry is contained on each board.

The image composition network's raw bandwidth determines the maximum screen resolution, frame rate, number of samples per pixel, and number of bits per pixel in the system. These parameters can be traded off against each other, but their product must be less than the total bandwidth.

The image composition network is composed of two parts: a data path, which carries pixel data from board to board, and a control path, which synchronizes and sequences transfers over the network. The image composition network control path is governed by the ready/go controller described below or other appropriate image composition network control means for synchronizing the transfer of data. We now describe one embodiment of these parts in more detail.

The datapath is a 256-bit wide point-to-point communication network that connects each pair of adjacent boards in the system. The interconnection wires are part of the system backplane. High-density connectors bring the data path wires out to each board, along with associated control signals. All of the active circuitry for the data path is contained on individual renderer/shader and frame-buffer boards.

Individual compositors 154 in the network are configurable under program control. Compositors may operate in one of the following four modes:

Composite. Composite pixel streams from the compositor buffer 153 of the enhanced memory device 150 with pixel streams at the compositor input 155. Transmit the result over the compositor output 156.

Load. Load the input stream into the enhanced memory devices.

Forward. Forward the input stream to the compositor output 156 without modification.

Unload. Send data from the enhanced memory device over the compositor output 156. Ignore pixels arriving at the compositor input 155.

The compositing operation may be performed by several methods. In one embodiment it is done by comparing the incoming pixel z value to the compositor buffer pixel z value to determine which pixel is visible. As those of skill in the art will recognize, other methods of compositing may be utilized with the present invention. For example, A-buffer compositing, in which pixels are represented by a variable-length list of fragments, may be used. To use A-buffer compositing, each renderer 10 computes an order list of fragments for each pixel, and the compositors interleave the fragments of the incoming pixel with the fragments of the pixel stored in the compositor buffer, deleting fragments which can no longer be visible.

In an embodiment using z-buffering, the Composite mode requires that pixels have their z value first and its bits ordered from most-significant bit (MSB) to least-significant bit (LSB). When the nearer pixel has been determined by comparing corresponding bits, the compositor 154 sets state bits recording which pixel is in front and that the priority decision has been made for this pixel. These two state bits determine which pixel is transmitted for the remaining z bits and all of the other data bits in the pixel.

The Composite mode is the only mode needed for renderer boards. Shaders 15 need the other modes, however, to load composited regions into their enhanced memory devices 150, unload regions that have been shaded, and to forward regions that pertain to other shaders.

Transfers over the image composition network 35 have a quantum of one region size. The number of bits in a pixel is variable. Once a transfer begins, however, all the pixels in a region-whatever the pixel size-are transmitted from the source board(s) and received at the destination board(s).

Region transfers typically perform one of two tasks. They either composite regions of pixels from renderers and deposit them into shaders or transfer shaded pixels to the frame buffer. (Other operations are possible, such as transferring a region from one renderer to another, but these are not needed in standard polygon rendering). Each region transfer has a particular meaning to each board in the system, and the format of the pixel data may differ, depending on the type of transfer. Each board must know the purpose of the transfer to configure itself correctly. The schedule of transfers for an individual board is called a rendering recipe. The rendering recipes on each board are the distributed controllers for the parallel system.

Transfer operations must be synchronized with great precision and low overhead to make maximum use of the image composition network 35. When a transfer begins and the upstream renderer begins to transmit pixels, downstream renderers must be ready to receive them at the correct clock cycle. The image composition network also must determine when all of the boards are ready to begin the next transfer. This decision must be made rapidly, since any delay affects the net bandwidth that can be achieved over the image-composition network, hence, the system's maximum speed. The control path of the image composition network implements these two functions. In addition, it synchronizes transfers with other components on each board.

The ready chain and go chain are hardware interlocks for synchronizing transfers over the image composition network 35. A ready token propagates upstream from board to board, indicating when boards are ready for the next transfer. A go token propagates downstream, triggering the start of a transfer.

Figure 8:
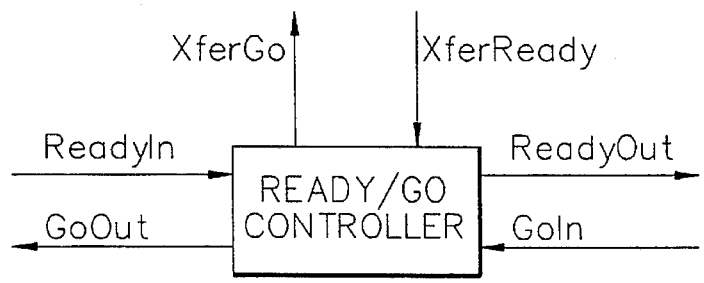
FIG. 8 is a block diagram illustrating an embodiment of the control logic for an image composition network according to the present invention.

As seen in FIG. 8, in one embodiment, the image generation controller 110 performs a ready/go controller function with three inputs and three outputs. The XferReady input comes from the rasterizer 120. It indicates when the rasterizer is ready for the next transfer to begin. XferReady, ReadyIn and ReadyOut implement the ready chain; the ready token is encoded by low-to-high transitions of ReadyOut on each board. GoIn, GoOut, and XferGo implement the go chain; the go token is encoded by low-to-high transitions of GoOut on each board.

In operation, the frame buffer 30 asserts ReadyOut when it is ready for the next transfer to begin. The ready/go controller of each image generation controller receives ReadyIn from the downstream controller and outputs ReadyOut to the upstream controller. It asserts ReadyOut after ReadyIn and XferReady have both been asserted. The transfer begins when ready reaches the upstream renderer. Thus, each board can delay the transfer until it is ready to begin.

Go propagates through the image composition network in the opposite direction of ready. The upstream image generation controller asserts XferGo and GoOut to begin a transfer. When each image generation controller receives GoIn, it asserts XferGo to the board and GoOut to the downstream controller. The boards cannot veto go in the same manner they can veto ready; they lost the privilege when they asserted XferReady. The arrival of go means that n clock cycles later (n is determined by the startup delay of the output sequencing circuitry), pixels will flow over the composition network. When the transfer has completed, the image generation controller deasserts XferGo and GoOut, the frame buffer 30 (when it is ready) asserts ReadyOut, and the next transfer cycle begins.

Figure 9:
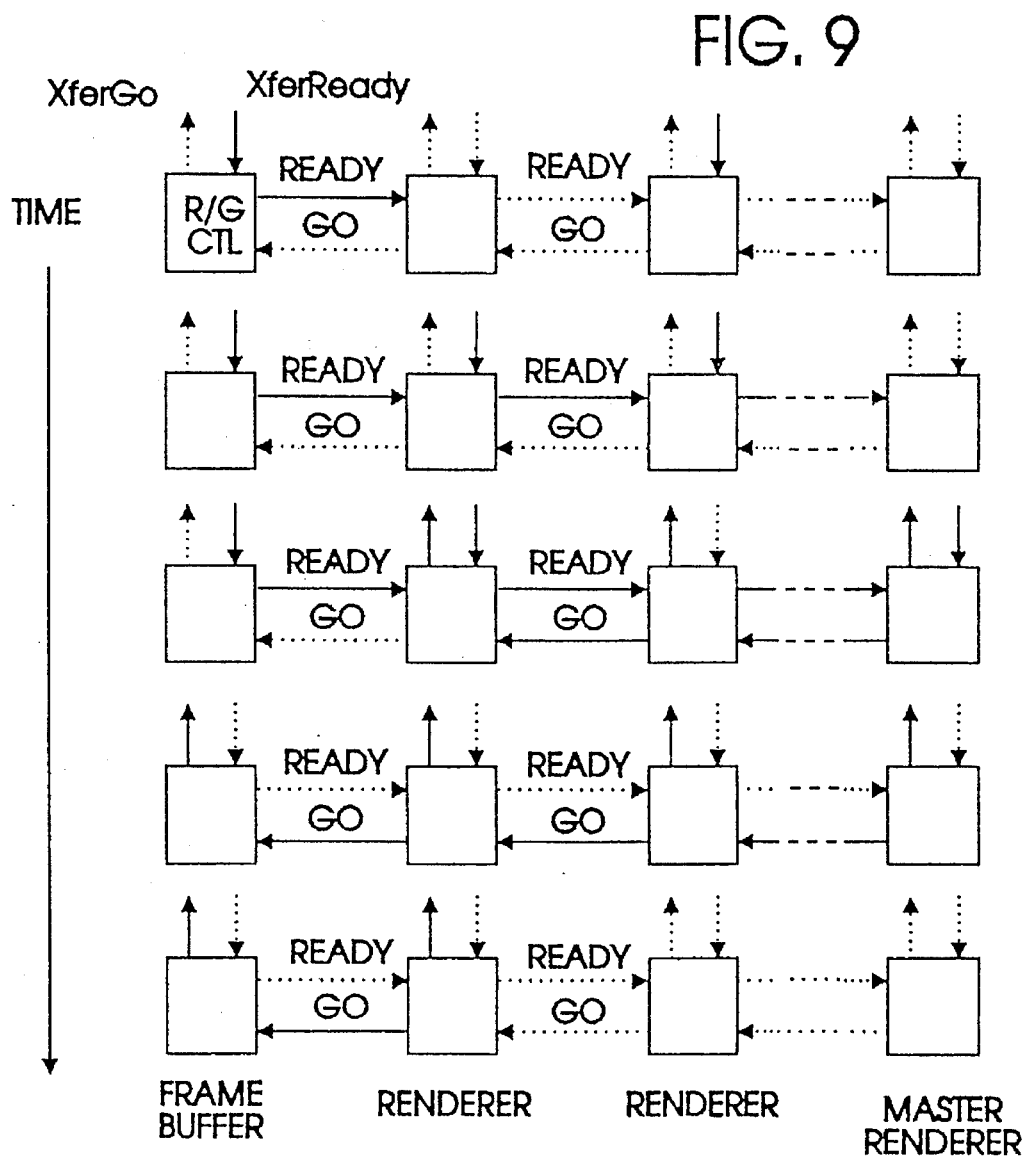
FIG. 9 is a block diagram illustrating an embodiment of the control flow of an image composition network according to the present invention showing ready and go chains with master and slave controllers at various stages during a transfer cycle.

The ready/go controller on the upstream renderer has a slightly different function. Rather than passing ready upstream and go downstream, it simply asserts GoOut after it receives ReadyIn and XferReady. Since this controller determines when a transfer actually begins, it is called the master controller. The controller on each board can function as either a slave or master. FIG. 9 shows the ready and go chains with master and slave controllers at various stages during a transfer cycle.

Note that all of the signals in the ready and go chains (except XferReady) operate at the image composition clock speed to keep up with the image-composition network data path and to reduce overhead. Even so, the overhead from the ready and go chains can be noticeable in large systems.

The XferGo signal from the control path indicates the beginning of a transfer. This signal may arrive at any clock cycle after XferReady has been asserted. The compositor sequencer configures and sequences the compositors 154 and the compositor ports 157 so that they are ready to composite, load, or unload pixels n clock cycles after XferGo is asserted.

The compositor sequencer has two parts: a configuration register and a timer. The configuration register stores the control bits that determine the compositor's operating mode (Composite, Load//Forward, or Unload) and the compositor port's transfer mode (read or write).

The timer keeps track of the number of pixels that have been composited and enables and disables the compositor port 157 at the appropriate time. It is preset before the transfer begins by the image generation controller 110 to the appropriate pixel length. After XferGo is asserted, it asserts the XferEnab signal to the enhanced memory device compositor port 157 for the precise length of time required to transfer all of the pixels in one region.

Renderer/Shader. A single board type may be used to implement both renderer and shader functions. A renderer/shader board may implement an entire z-buffer rendering engine capable of rendering well over 1 million z-buffered triangles per second and shading 128×128 pixels in parallel. The image generation system of the present invention can be configured with any number of renderer/shaders. Renderers 10 are responsible for transforming and rasterizing primitives, and compositing the rendered pixels with pixels from other renderers. Shaders 15 receive rendered pixels from the image-composition network, buffer them, evaluate a shading model for all of the pixels in a 128×128-pixel region in parallel, and forward the pixels to the frame buffer 30. A renderer/shader board has two main parts: a geometry processor 100, and a rasterizer 120.

Geometry Processor. The geometry processor includes a processing means 504 which may be a fast floating-point processor. It may contain its own local memory and has access to the host interface 130 and the rasterizer 120. The geometry processor 100 is responsible for transforming primitives from object coordinates into screen coordinates, computing instructions to be passed to the rasterizer, and sorting these into bins corresponding to individual screen regions. The geometry processor's memory 502 in one embodiment uses video RAM (VRAM) rather than conventional DRAM. The VRAMs' random ports are connected to the memory bus. The VRAM's serial ports are connected to the image generation controller's input port 440. The VRAMs, together with a DMA controller 510, form an input interface to the image generation controller 110.

Figure 10:
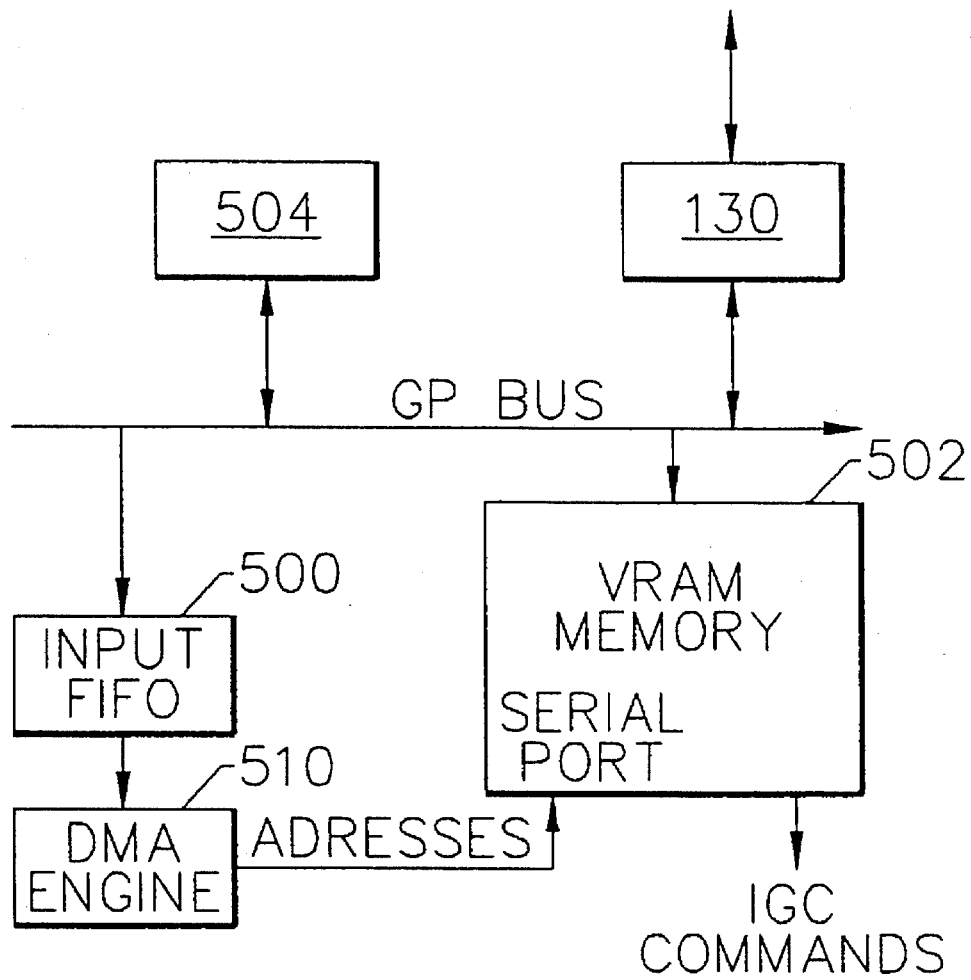
FIG. 10 is a block diagram illustrating an embodiment of a command queue providing communication buffering between a geometry processor and a rasterizer according to the present invention.

As shown in FIG. 10, a command queue, preferably a FIFO 500 provides communication and buffering between the geometry processor and the rasterizer. The FIFO 500 stores pointers to blocks of data in the geometry processor's VRAM memory and the length of each block.

A DMA controller 510 reads pointers from the FIFO 500 and fetches the data from the VRAMs' serial ports. The serial ports of all of the VRAM banks are connected together to a common 32-bit bus and are connected to the image generation controller input port. The DMA controller 510 handshakes with the image generation controller 110 to allow a 32-bit command word to be loaded every 66 MHz clock cycle.

Figure 11:
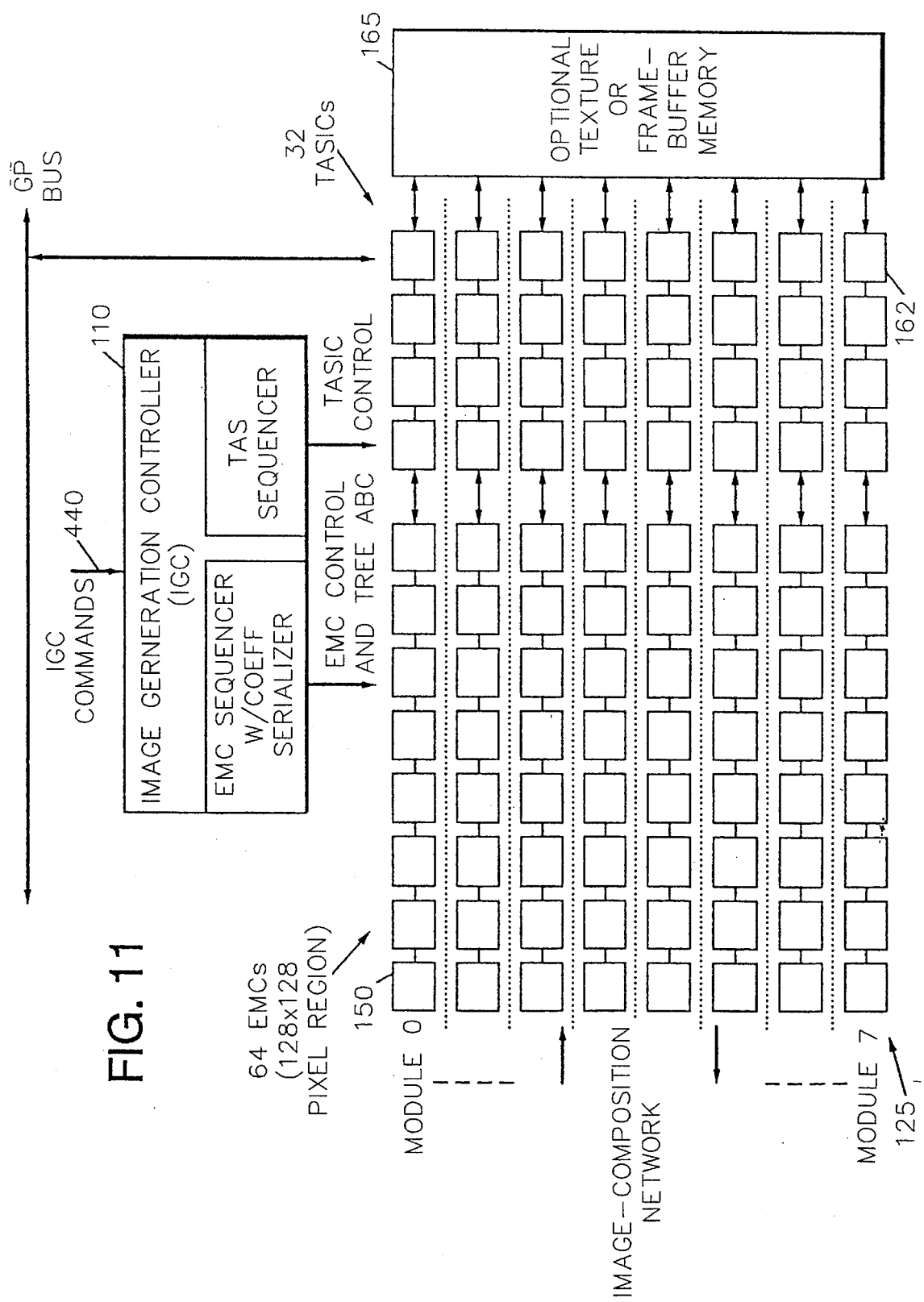
FIG. 11 is a block diagram illustrating an embodiment of a rasterizer according to the present invention.

Rasterizer. The Rasterizer 120 is the central part of each renderer/shader board. The core of the rasterizer, which is the same on every board, along with board-specific circuitry, such as texture memory on a shader board, or video memory on a video board are included in the rasterizer. The rasterizer core contains an array of 64 enhanced memory devices 150, an array of 32 texture ASICs 162, and an image generation controller 110, as shown in FIG. 11.

The enhanced memory devices 150 form an array 125 of 128×128 (16,384) byte-serial pixel processing elements, operating in Single-Instruction/Multiple DataStream (SIMD) fashion. In typical system operation, these processing elements are mapped onto a 128×128 pixel region on the screen, one processing element per pixel, with the local values of F(x, y) corresponding to a processing element's (x, y) pixel address.

The texture ASICs 162 are datapath chips, which connect the enhanced memory devices 150 to the geometry processor bus and to optional external memory 165 for texture or image storage.

The image generation controller 110 interprets instructions from the geometry processor. It is a microcoded engine with two sequencers that executes high-level instructions for the enhanced memory devices 150 and texture ASICs 162, controlling their cycle-by-cycle operation.

In addition to the rasterizer core, a Shader Board contains DRAM memory for storing textures. A Video Board contains VRAM memory for storing pixels during frame scan-in and scan-out. A Renderer Board contains no extra circuitry, but the texture ASICs implement an interface between enhanced memory devices memory and the geometry processor bus (this connection is present on every board type).

Figure 12:
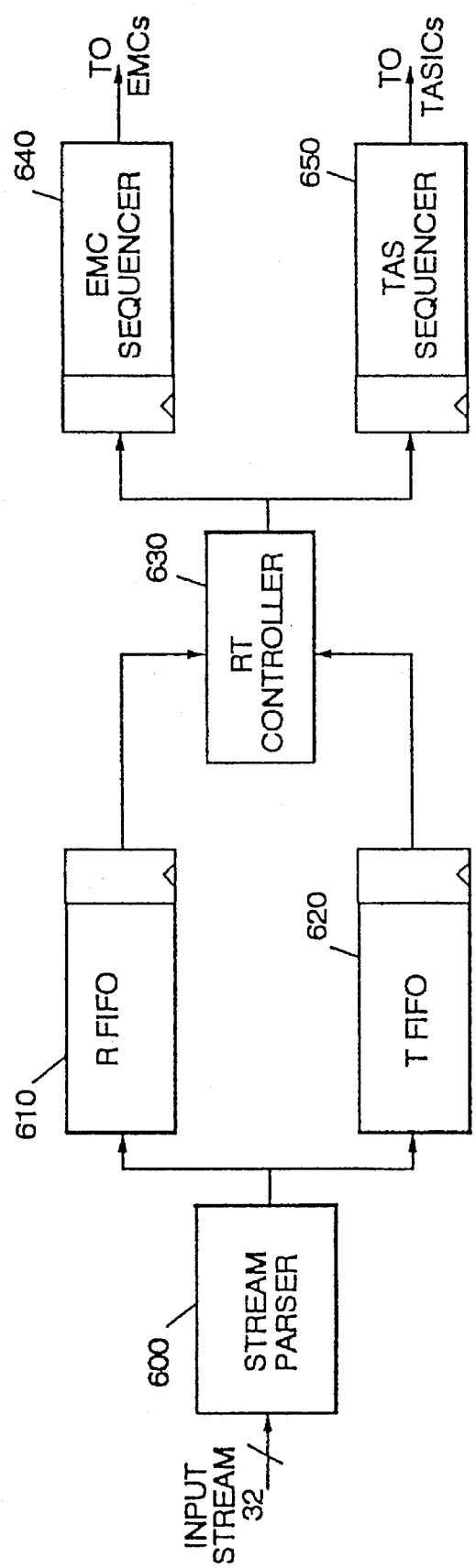
FIG. 12 is a block diagram illustrating an embodiment of an image generation controller according to the present invention.

Image Generation Controller. In one embodiment, the image generation controller 110 processes commands from the geometry processor 100, controls and sequences the enhanced memory devices 150 and texture ASICs 162, and synchronizes the rasterizer with the image-composition network 35. The image generation controller may be a custom chip with separate sequencers and microcode stores for controlling the enhanced memory devices and texture ASICs; the enhanced memory device sequencer includes a serializer to convert floating-point input coefficients into the fixed-point, byte-serial form required by the enhanced memory devices. FIG. 12 shows a block diagram of the image generation controller.

Commands for the image generation controller can have different formats. They can contain some or all of the following 5 arguments depending on the purpose of the instruction:

I-word, mandatory, contains the instruction opcode and a few parameters for the microcode routine. The I-word is present in every command and is the first word in the command;

P-word, optional, contains additional parameters for the microcode routine; and

A, B, and C coefficients, optional, operands for the linear expression evaluator.

The I-word and P-word are each 32-bit quantities. The A, B, and C coefficients may be either 32- or 64-bit integers or floating-point numbers. The image generation controller contains a 256-bit wide input command register, holding an entire command made up of these arguments. The physical input interface to the image generation controller is 32-bits wide. A stream parser 600 parses the input stream, loading each word into the appropriate portion of the command register. The remainder of the input interface handles commands as single units, irrespective of their format.

The rasterizer's task consists of two parts: (1) rasterization-the calculation (or shading) of pixel values, and (2) compositor setup-copying pixel data to the compositor buffer section 154 of enhanced memory device pixel memory and controlling the compositor 154. Unfortunately, the two parts must be performed as asynchronous processes, since multiple regions of pixel values can be buffered in pixel memory and region transfers can occur at unpredictable times (when the image-composition network is ready to transfer a new region).

To be able to execute these tasks asynchronously, incoming image generation controller commands must be buffered in two command queues, preferably FIFOs: the RFIFO 610 buffers rendering commands, and the TFIFO 620 buffers transfer commands. Arbitration logic is needed to synchronize the operation of the two FIFOs.

The FIFOs are wide enough to hold an entire command in each entry. A bit in the I-word of each command determines whether the command is to be loaded into the RFIFO 610 or TFIFO 620. The RFIFO 610 can hold up to 64 commands and the TFIFO 620 can hold up to 1024 commands. Hardware keeps track of the number of commands stored in the FIFOs and asserts the status register bit when either FIFO is nearly full. The geometry processor 100 detects the assertion of this status register bit to prevent overflow of Image Generation Controller FIFOs.

The FIFOs are emptied by the RT Controller 630, which keeps track of the number of region buffers available in pixel memory, as well as the status of the image-composition network 35. Initially, it reads commands from the RFIFO 610. When a new image-composition network transfer needs to be (and is ready to be) initiated, the command stream from the RFIFO 610 is interrupted and commands are read from the TFIFO 620. These commands copy data from the storage means 152 to the compositor buffer 153 and initiate a transfer. As soon as the new transfer is initiated, command stream processing reverts to the RFIFO 610.

The RT Controller 630 maintains two internal 4-bit counters: FreeBuffs and FullBuffs, indicating the number of free and full buffers of pixel data in the enhanced memory device 150. When the image generation controller 110 is reset, FreeBuffs and FullBuffs are each set to 0. Software must set FreeBuffs to the number of empty pixel buffers available in the enhanced memory devices. These counters are used like semaphores to determine whether commands can be safely executed from each of the input FIFOs. For example, when FreeBuffs=0, rasterization must halt; no buffer is available to hold any further results. Also, a transfer can only begin when FullBuffs>0. FreeBuffs and FullBuffs can be incremented and decremented using special control commands embedded in the incoming command stream.

In one embodiment, the image generation controller 110 contains two sequencers, the EMC Sequencer 640 and the TAS Sequencer 650. The EMC Sequencer 640 generates micro-instructions for the pixel processors 151, addresses into pixel memory 220, and ABC coefficients for the linear expression evaluator 200; commands to the EMC Sequencer 640 are used to rasterize polygons (on Renderer boards) and to perform shading calculations (on Shader boards). The TAS Sequencer 650 controls the texture ASICs 162 and attached memory 165; commands to the TAS Sequencer 650 are used for moving data between the pixel memory 220 on the enhanced memory devices 150 and attached memory 165 on Shader or Video boards, or between pixel memory 220 on the enhanced memory devices 150 and the geometry processor bus.

The EMC Sequencer 640 and TAS Sequencer 650 each contain local microcode memory. A bit in the I-word of each command indicates which sequencer is to execute the command. The I-word also specifies the starting microcode address for the command. Each sequencer can conditionally branch, both on internal conditions (such as the value of loop counters) and external conditions (two condition code inputs for each sequencer). The sequencers have no stack. They also have several external control outputs which allow them to implement miscellaneous control functions on the rasterizer board.

Enhanced Memory Devices. In one embodiment, the array 125 of 64 enhanced memory devices 150 implements a 2-dimensional SIMD processor array that covers a 128×128-pixel region of the screen. This logical array can be "moved" to process any 128×128-pixel region of the display screen; the region is normally aligned to 128-pixel boundaries, but it can be positioned arbitrarily.

Each pixel is provided with its own 8-bit ALU 210, an output of the linear-expression evaluator tree (the LEE) 200, 2048 bits of local memory 152, a 256-bit compositor buffer 153, and a 256-bit local data buffer 161. FIG. 5 shows a logical diagram of an enhanced memory device.

Each pixel ALU 210 is a general-purpose 8-bit processor; it includes an enable register which allows operations to be performed on a subset of the pixels. The pixel ALU can use linear expression evaluator results or local memory 220 as operands and can write results back to local memory. It can also transfer data between memory and the local and compositor buffers.

The image generation controller 110 controls the operation of the enhanced memory device array 125. Image generation controller instructions and coefficients are serialized and broadcast to all of the enhanced memory devices in parallel. The SIMD pixel processors execute these instructions in lock-step. The enable registers in each pixel processor are used to control which subset of the pixel processors are active at any given time.

Each pixel is provided with 256+32+32 bytes of local memory. As discussed above, the memory is divided into 3 partitions: a 256-byte main partition, which is used for most computation, and two 32-byte partitions used for external communication.

Normally, all 256+32+32 bytes of pixel memory can be accessed. However, when communication-port operations are performed, their buffer data temporarily is unavailable. For example, after pixel data to be composited is copied into the compositor buffer, the composition operation is initiated, and memory in the compositor buffer cannot be accessed by the ALU until the composition operation is complete. Similarly, to perform a local-port operation, data is moved into the local buffer and the local-port operation is initiated; at this point, the local buffer must not be accessed by the ALU until the operation is complete.

The image-composition port and local port allow pixel data to be transferred serially to/from the enhanced memory devices to other enhanced memory devices (for compositing) or to/from the texture ASICs (to perform texture lookups or pixel-data writes to texture or video memory). Data from each pixel is presented serially at each port. The number of bytes transferred to/from each pixel and their location in the communication buffer are designated by configuration commands. The image-composition port includes the compositor input 155 and the compositor output 156 both of which are 4-bit ports running at 132 MHz. The local port is a 4-bit port that runs at 66 MHz.

Each enhanced memory device has an output which represents the logical-OR of the enable registers of all pixels. These outputs are wire-anded together to form the global-enable signal (EOrH), the logical-OR of the enable registers for the entire SIMD array. EOrH is fed into an external condition-code input of the EMC sequencer. Commands to the EMC sequencer can test the status of EOr, and based on the result, can conditionally execute. The status of EOr can be communicated to the geometry processor.

Figure 13:
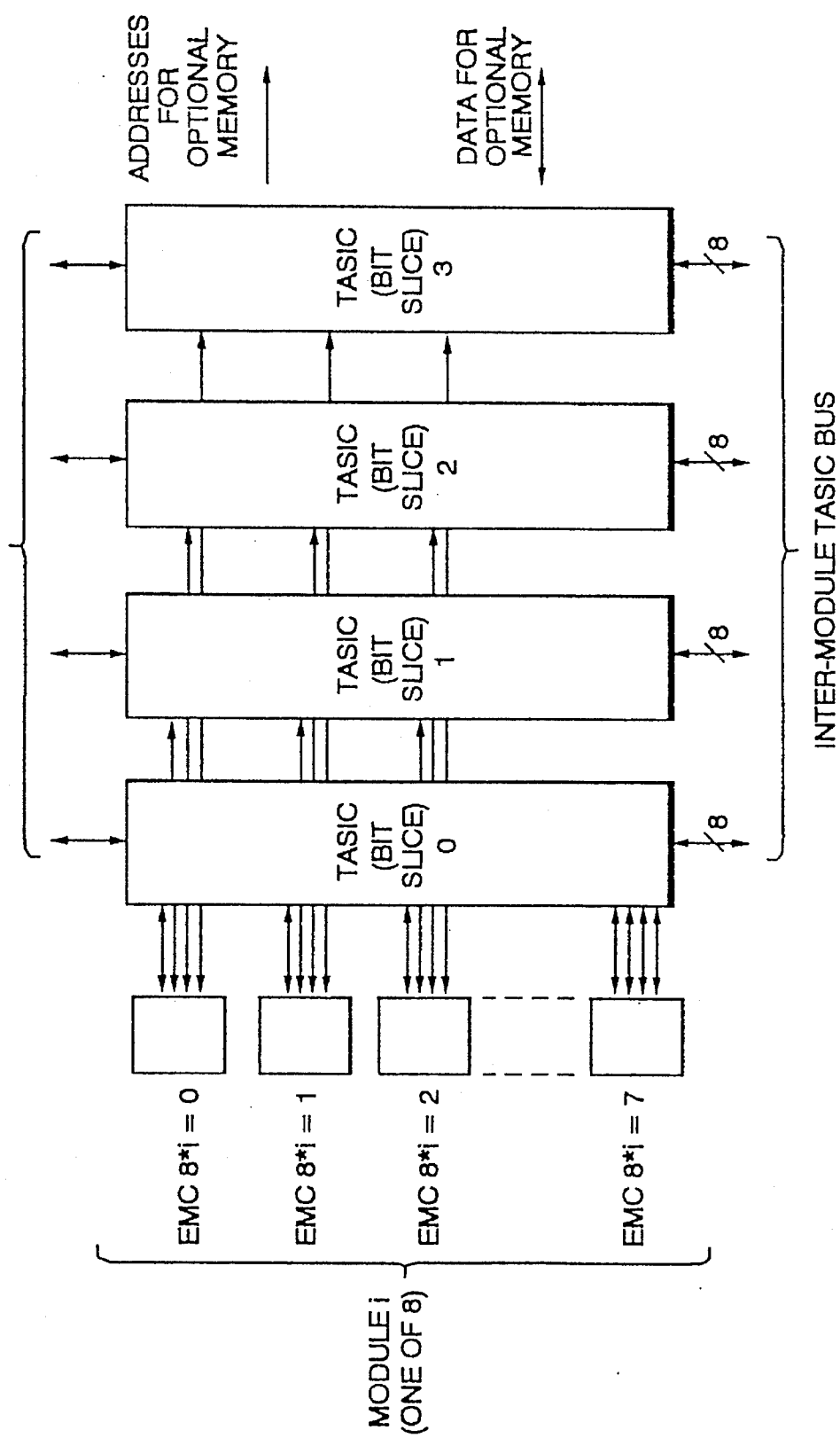
FIG. 13 is a block diagram illustrating an embodiment of the connection between the texture ASICs and the enhanced memory devices according to the present invention.

Texture ASICS. The array of 32 Texture ASICS implement a data-parallel communication interface between pixel memory in the enhanced memory devices, the bus of the geometry processor microprocessor, and optional texture or video memory. The 32 texture ASICs are divided among the 8 modules, so that each module consists of eight enhanced memory devices and four texture ASICs. The texture ASICs are connected to the enhanced memory devices' 4-bit local ports in bit-sliced fashion, as shown in FIG. 13. The texture ASICs are also connected to a bit-sliced 32-bit bus, which spans all eight modules. This TASIC bus provides a logical connection between modules, so pixel data can be shared when necessary. The 4-bit interface between enhanced memory devices and the texture ASICs, as well as the TASIC bus run at 66 MHz.

Figure 14:
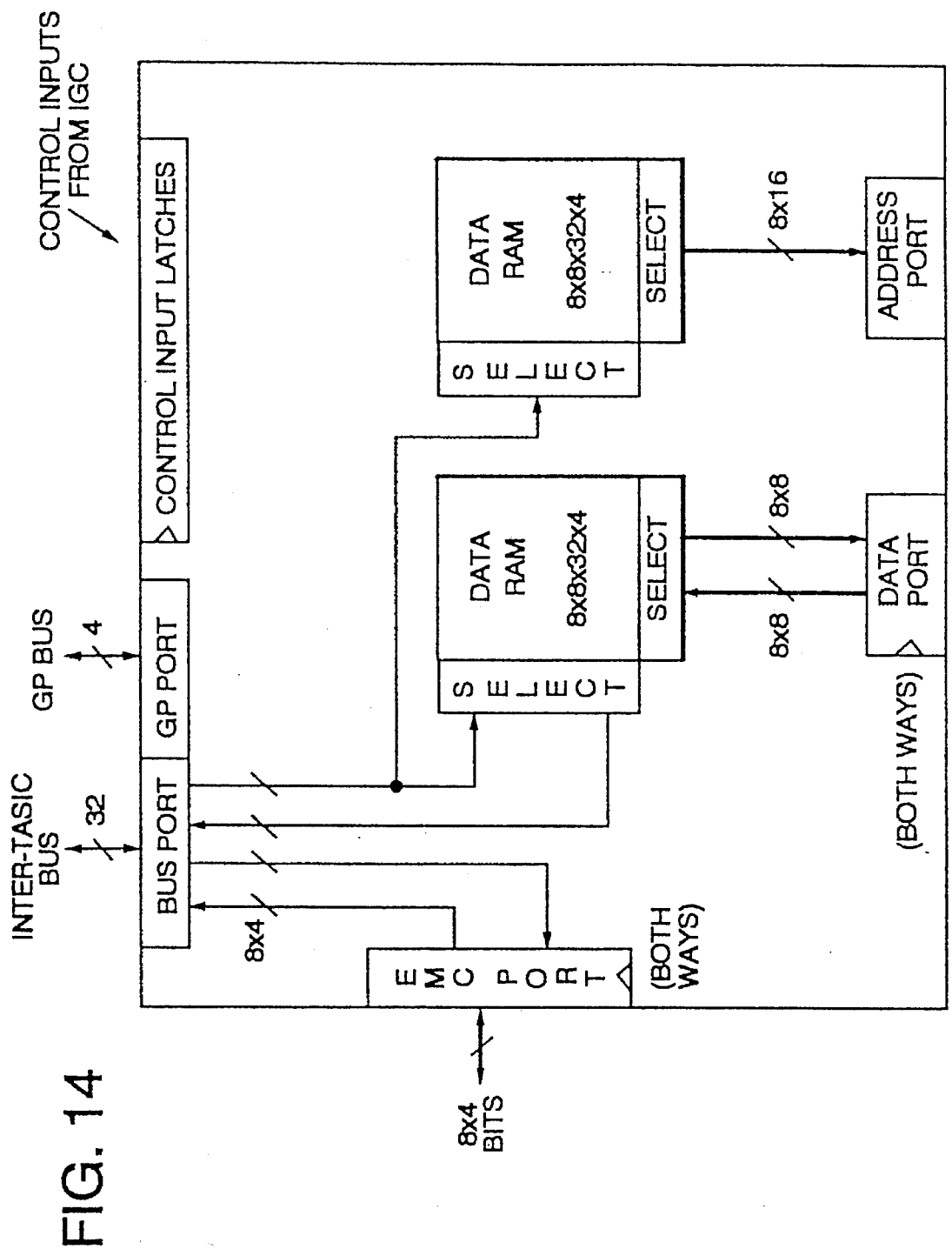
FIG. 14 is a block diagram illustrating an embodiment of a texture ASIC chip according to the present invention.

FIG. 14 shows a block diagram of a texture ASIC chip. Internally, it is composed of a dual-ported RAM for buffering and serializing/parallelizing addresses and data to/from enhanced memory device memory, several configurable datapaths, and a bidirectional port that can connect directly to external memory. The clock-by-clock operation of the texture ASIC array is controlled by the TAS Sequencer in the image generation controller, which is independent of the EMC Sequencer on the image generation controller. The TAS Sequencer controls the enhanced memory device's local ports, however, since these interface directly to the texture ASICs.

The texture ASICs' external memory ports are unused on Renderer boards; they connect to texture memory on Shader boards; they connect to video memory on Video boards.

Renderer, Shader, Video Board Differences. The rasterizer on the Renderer Board consists simply of the Rasterizer core. This is the only circuitry needed for most rasterization calculations.

The rasterizer on the Shader Board contains an array of 128 4-Mbit×4 DRAM (16 megabit) memory chips, attached to the TASIC memory ports. This additional memory can be used to store and look up image-based textures, provide inter-pixel communication for image-warping operations, or serve as backing store for memory-intensive rendering algorithms.

Figure 15:
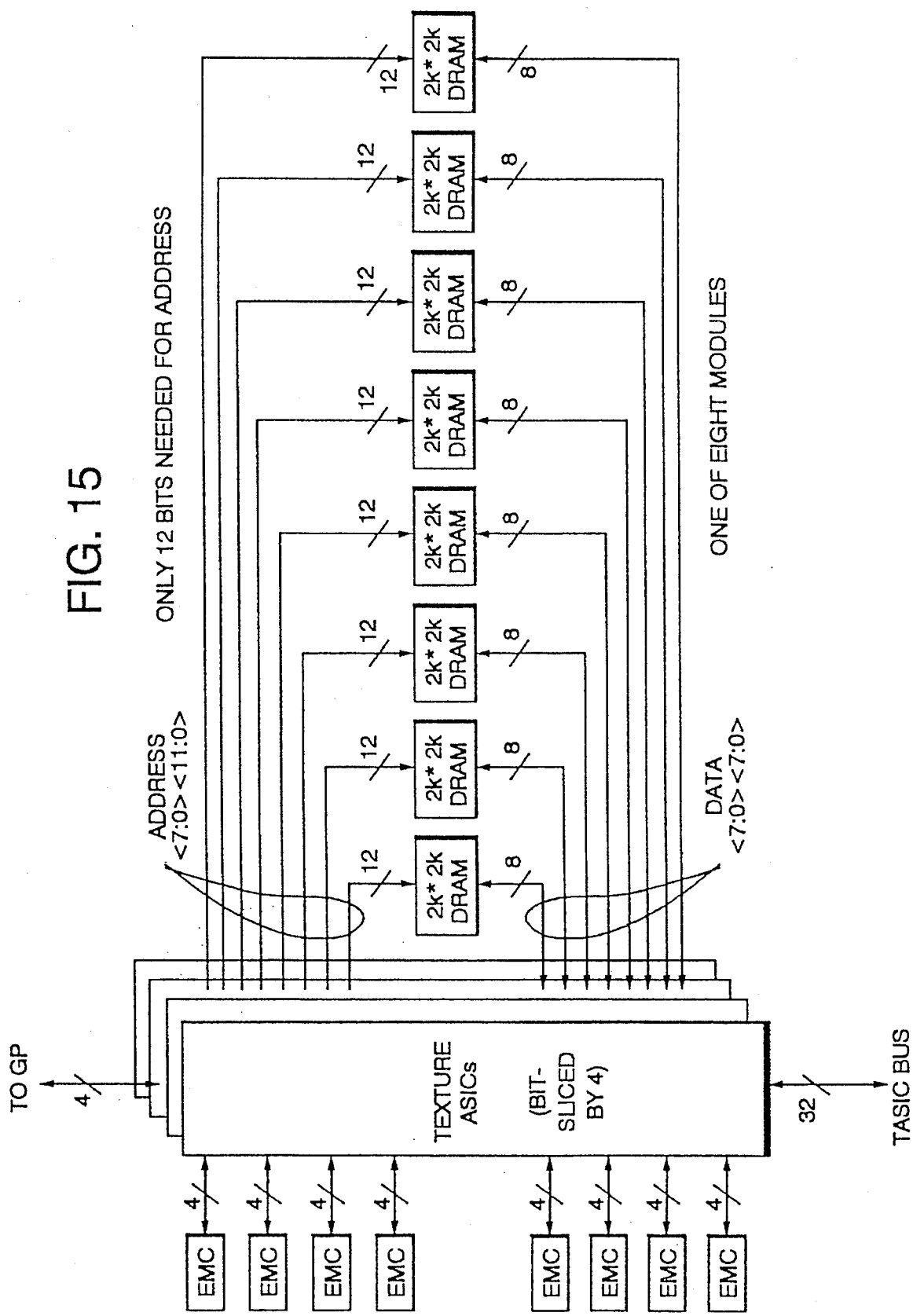
FIG. 15 is a block diagram illustrating an embodiment of a shader board module according to the present invention.

The memories are divided among the eight modules, along with the enhanced memory devices and texture ASICs. The 16 DRAMs in a module are arranged as 8 banks of memory, each bank being 2K×2K bytes in size. The total storage per module is 32 megabytes. The banks are controlled globally (all eight do a memory operation at the same time), but addresses may differ. FIG. 15 shows a block diagram of one Shader-board module.

Organization of the memories on the Video Board is very similar to that of the Shader Board; the memories are VRAMs, rather than DRAMs. The display is refreshed from the video port of the VRAMs. Since pixels are stored byte-serially, a corner-turning function must be performed between the VRAM serial ports and the color look-up tables and DACs. This is done using a set of programmable-logic parts, which also perform the necessary multiplexing. Transferring data to/from video memory is similar to transferring data to/from texture memory. The enhanced memory devices compute addresses for data items to be stored, then the texture ASICs transfer the addresses and data to/from video memory.

The texture ASICs contain internal address counters for generating video row-load addresses. These counters are initialized by the image generation controller and are controlled by special inputs on each texture ASIC that are driven by board-level video refresh circuitry.

Figure 16:
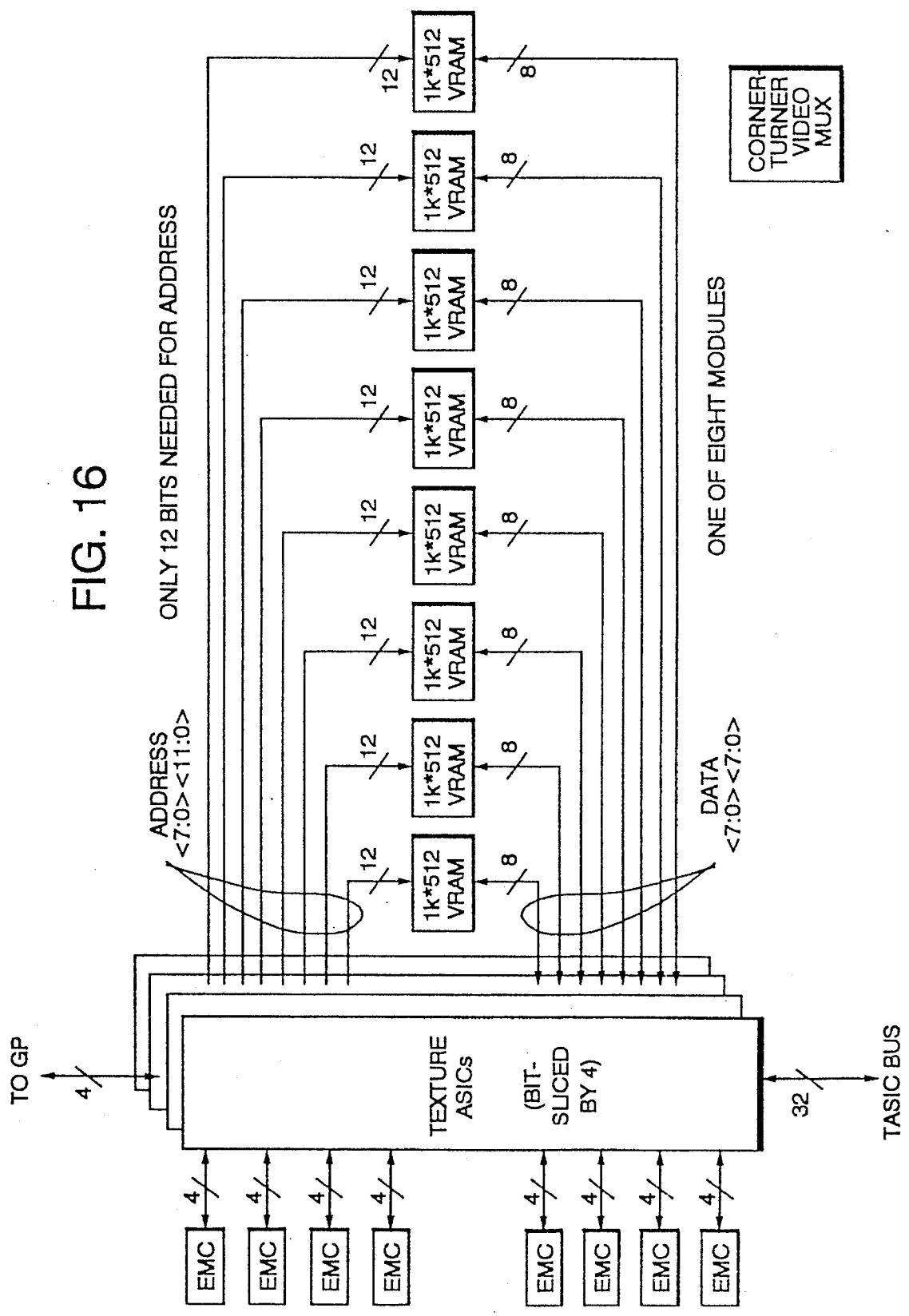
FIG. 16 is a block diagram illustrating an embodiment of one module of a video board rasterizer according to the present invention.

FIG. 16 shows a block diagram of one module of the Video Board rasterizer. As on the Shader Board, the enhanced memory devices calculate addresses for memory accesses, and the memories are organized to support both fast-page and random access modes. Normally pixels would be written into memory byte-serially, using a random-access cycle followed by fast-page mode cycles.

The foregoing is illustrative of the present invention, and is not to be construed as limiting thereof. The invention is defined by the following claims, with equivalents of the claims to be included therein.

That which is claimed is:

1. An image generation system, comprising:
   (a) primitive processing means for generating primitive screen data; and,
   (b) a plurality of rasterizers associated with said primitive processing means for computing pixel values from said primitive screen data, each of said rasterizers comprising an enhanced memory device, said enhanced memory device corresponding to a selected set of screen coordinates,
      (i) said enhanced memory device having for each of said selected screen coordinates,
         internal processing means for computing pixel values to provide a computed pixel value,
         storage means associated with each of said internal processing means for storing data, and,
         compositor buffer associated with each of said internal processing means for storing said computed pixel value, and
      (ii) said enhanced memory device further having,
         input means for receiving computed pixel values from a different one of said plurality of rasterizers,
         compositor means for compositing said stored computed pixel value and the pixel value received by said input means to determine a composited pixel value,
         output means operably associated with said compositor means for outputting said composited pixel value; and
   (c) at least one of said plurality of rasterizers further comprising external memory means operably associated with said enhanced memory device for storing imaging information.

2. The image generation system of claim 1 wherein said enhanced memory device associated with said one of said plurality of rasterizers having said external memory means further comprises:
   local buffer means operably associated with said internal processing means for storing data from and providing data to said internal processing means; and
   port means for inputting data to and outputting data from said local buffer means to said external memory means.

3. The image generation system of claim 1 wherein said compositor means of one of said rasterizers further comprises:
   loading means for storing the pixel values received from said input means for use by said internal processing means.

4. The image generation system of claim 1 wherein said one of said rasterizers further comprises video generation means, operably associated with said external memory means for creating a video signal.

5. The image generation system of claim 1 wherein said primitive screen data comprises coefficients of mathematical expressions defining a primitive in screen coordinates.

6. The image generation system of claim 1 wherein said one of said rasterizers further comprises control means for supersampling said primitive screen data by receiving said primitive screen data from said primitive processing means and repeatedly providing to said enhanced memory device adjusted screen data for each primitive screen data received.

7. The image generation system of claim 1 wherein said enhanced memory device further comprises:
   coefficient input means for receiving coefficients of mathematical expressions of the form f(x,y), and
   wherein said internal processing means comprises:
      (i) a mathematical expression evaluator for receiving the coefficients and outputting the results of evaluating the mathematical expressions f(x,y), and
      (ii) an arithmetic logic unit corresponding to each of said selected screen coordinates for receiving the results of said mathematical expression evaluator and performing arithmetic and logical operations on said results.

8. The image generation system of claim 1 wherein the primitive screen data for a selected region of a screen is distributed between said plurality of rasterizers.

9. The image generation system of claim 1 wherein said primitive screen data comprises primitive screen data for a selected region of a screen and further comprising:

image composition network control means operably associated with said compositor means for synchronizing said compositors such that data is output by said output means after all pixel values have been calculated by each of said rasterizers for said selected region.

10. The image generation system of claim 1 wherein said primitive processing means comprises a plurality of geometry processors for receiving primitives and translating said primitives to screen coordinates to provide primitive screen data.

11. An image generation system, comprising:

(a) a plurality of geometry processors for receiving primitives for a selected region of a screen and translating said primitives to screen coordinates to provide primitive screen data and for providing imaging information;

(b) a plurality of rasterizers wherein a rasterizer is associated with each of said geometry processors for computing pixel values from said primitive screen data, said rasterizer comprising, image generation control means for receiving said primitive screen data from said geometry processors and converting said primitive screen data to enhanced memory command information;

an enhanced memory device corresponding to a selected set of screen coordinates, (i) said enhanced memory device having for each of said selected screen coordinates,
internal processing means for receiving said command information and computing pixel values to provide a computed pixel value,
storage means associated with each of said internal processing means for storing data, and,
compositor buffer associated with each of said internal processing means for storing said computed pixel value, and (ii) said enhanced memory device further having, input means for receiving computed pixel values from a corresponding one of said enhanced memory devices associated with a different one of said plurality of geometry processors,
compositor means for compositing said stored computed pixel value and the pixel value received by said input means to determine a composited pixel value, and
output means operably associated with said compositor means for outputting said composited pixel value; and (c) at least one of said plurality of rasterizers further comprising:
external memory means operably associated with said enhanced memory device for storing imaging information; and
means for transferring imaging information directly from said geometry processor associated with said one of said rasterizers to said external memory means.

12. The image generation system of claim 11 wherein said enhanced memory device associated with said one of said plurality of rasterizers having said external memory means further comprises:

local buffer means operably associated with said internal processing means for storing data from and providing data to said internal processing means; and port means for inputting data to and outputting data from said local buffer means to said external memory means.

13. The image generation system of claim 11 wherein said means for transferring further comprises means for selectively transferring imaging information from said external memory and said enhanced memory device to said geometry processor associated with said one of said rasterizers.

14. The image generation system of claim 11 wherein said image generation control means further comprises means for receiving said imaging information from said geometry processors and transferring said imaging information to said external memory.

15. The image generation system of claim 11 wherein said one of said rasterizers further comprises video generation means, operably associated with said external memory means for creating a video signal.

* * * * *

UNITED STATES PATENT AND TRADEMARK OFFICE
CERTIFICATE OF CORRECTION

PATENT NO. : 5,481,669
DATED : 02 January 1996
INVENTOR(S) : John W. Poulton, Steven E. Molnar, John G. Eyles It is certified that error appears in the above-identified patent and that said Letters Patent is hereby corrected as shown below:

After Assignee please insert
    --Notice: The portion of the term of this patent
    subsequent to Nov. 13, 2012 has been disclaimed--

Signed and Sealed this

Sixteenth Day of July, 1996

*Attest:*

BRUCE LEHMAN

*Attesting Officer*    *Commissioner of Patents and Trademarks*